(12) United States Patent
Li

(10) Patent No.: US 11,728,662 B2
(45) Date of Patent: Aug. 15, 2023

(54) CELL BALANCING DEVICE BASED ON CAPACITOR NETWORK, CASCADABLE BALANCED BATTERY PACK AND CONTROL METHOD THEREOF

(71) Applicants: QINGDAO ANJIE ENERGY TECHNOLOGY Co., Ltd., Qingdao (CN); Yanquan Li, Qingdao (CN)

(72) Inventor: Yanquan Li, Qingdao (CN)

(73) Assignees: QINGDAO ANJIE ENERGY TECHNOLOGY CO. LTD., Qingdao (CN); Yanquan Li, Qingdao (CN)

( * ) Notice: Subject to any disclaimer, the term of this patent is extended or adjusted under 35 U.S.C. 154(b) by 0 days.

(21) Appl. No.: 17/991,778

(22) Filed: Nov. 21, 2022

(65) Prior Publication Data

US 2023/0077926 A1 Mar. 16, 2023

Related U.S. Application Data

(63) Continuation of application No. PCT/CN2021/094010, filed on May 17, 2021.

(30) Foreign Application Priority Data

Jun. 1, 2020 (CN) .......................... 202010485581.8

(51) Int. Cl.
*H02J 7/00* (2006.01)
*H02J 7/34* (2006.01)
(Continued)

(52) U.S. Cl.
CPC ....... *H02J 7/0019* (2013.01); *H01M 10/4264* (2013.01); *H01M 10/441* (2013.01);
(Continued)

(58) Field of Classification Search
CPC .................................. H02J 7/00; H02J 7/0019
See application file for complete search history.

(56) References Cited

U.S. PATENT DOCUMENTS

| 2013/0278218 A1* | 10/2013 | Onnerud | H02J 7/0016 |
| | | | 320/118 |
| 2013/0342156 A1* | 12/2013 | Nakao | B60L 58/22 |
| | | | 320/104 |
| 2018/0205238 A1 | 7/2018 | Uno | |

FOREIGN PATENT DOCUMENTS

| CN | 106849235 A | 6/2017 |
| CN | 107104482 A | 8/2017 |

(Continued)

OTHER PUBLICATIONS

Search Report of the priority application CN202010485581.8.
(Continued)

*Primary Examiner* — Robert Grant
(74) *Attorney, Agent, or Firm* — J.C. Patents

(57) ABSTRACT

A cell balancing device based on a capacitor network, a cascadable balancing battery pack, and a control method thereof, used for battery pack balancing control, and the battery pack being composed of n battery units connected in series; the cell balancing device comprises: n half bridge circuits, each half bridge circuit being connected in parallel to two ends of a battery unit, the midpoint of each half bridge circuit being connected in parallel to a corresponding switch capacitor, and each half bridge circuit comprising two switch transistors connected in series; an energy storage capacitor network, comprising a basic energy storage capacitor network composed of n switch capacitors connected in series; a chain-type driving capacitor network, one end thereof being electrically connected to one of the half bridge circuits or the energy storage capacitor network, and the other end thereof being electrically connected to a drive (Continued)

pulse generator, and the drive pulse generator being electrically connected to the chain drive capacitor network; and a control logic circuit electrically connected to the battery pack, the drive pulse generator, and a master control panel. Using the present solution, the cell balancing device of the present application has excellent balancing effects, reliable performance, strong universality, and strong scalability.

10 Claims, 9 Drawing Sheets

(51) Int. Cl.
  *H01M 10/42* (2006.01)
  *H01M 10/44* (2006.01)
  *H02M 3/07* (2006.01)
(52) U.S. Cl.
  CPC .......... *H02J 7/0032* (2013.01); *H02J 7/0047* (2013.01); *H02J 7/00308* (2020.01); *H02J 7/007182* (2020.01); *H02J 7/342* (2020.01); *H02M 3/07* (2013.01); *H01M 2010/4271* (2013.01); *H01M 2220/20* (2013.01)

(56) References Cited

FOREIGN PATENT DOCUMENTS

| | | |
|---|---|---|
| CN | 107579575 A | 1/2018 |
| CN | 108711901 A | 10/2018 |
| CN | 110932363 A | 3/2020 |
| CN | 111211587 A | 5/2020 |
| CN | 111564886 A | 8/2020 |
| DE | 102012015621 A1 | 2/2014 |
| JP | 2013009485 A | 1/2013 |
| WO | WO2017014300 A1 | 1/2017 |

OTHER PUBLICATIONS

International Search Report of PCT/CN2021/094010.
NPL1: "Learn Circuit Basics from Scratch", authored by Jianqinbg Liu, published on Jan. 30, 2007, pp. 164-168.
NPL2: "Study on Capacitive Equalizing System for Series Battery", Journal of Chongqing University of Technology (Natural Science), vol. 30, No. 1, Jan. 2016, pp. 1-6.

* cited by examiner

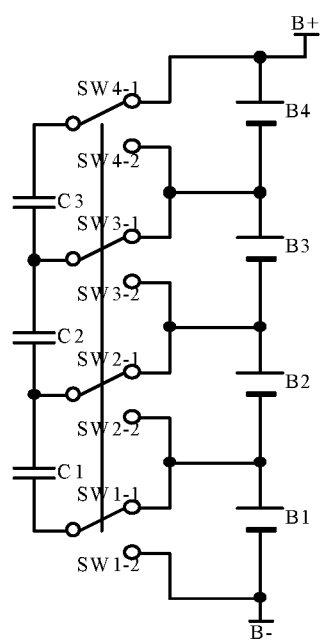
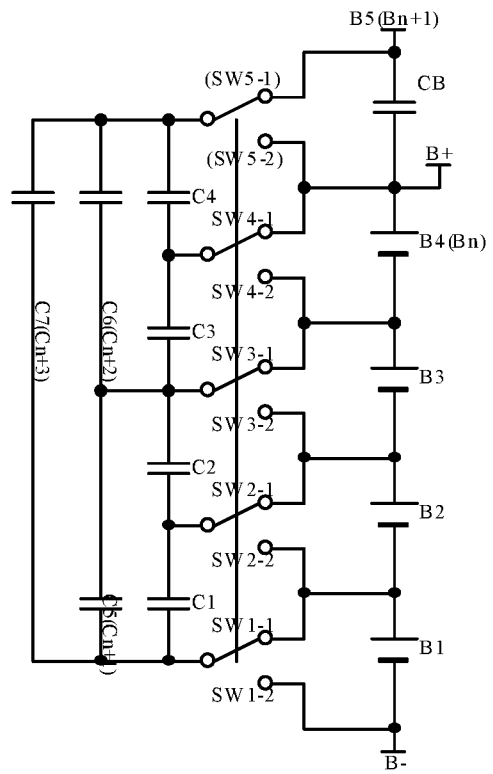
Fig. 1a   Fig. 1b
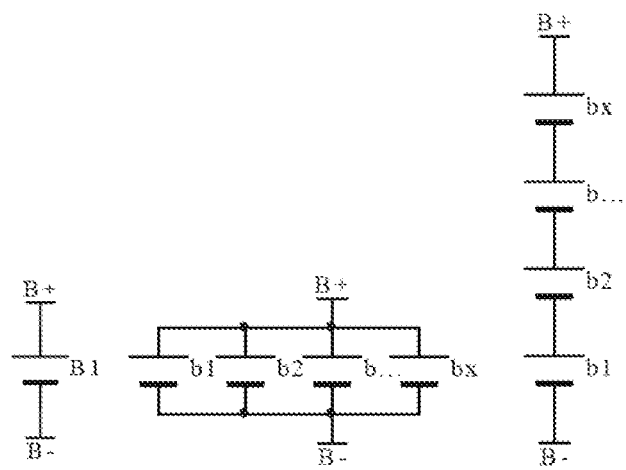
Fig.2a   Fig.2b   Fig.2c

CELL BALANCING DEVICE BASED ON CAPACITOR NETWORK, CASCADABLE BALANCED BATTERY PACK AND CONTROL METHOD THEREOF

CROSS REFERENCE TO RELATED APPLICATIONS

This application is a continuation of PTC/CN2021/094010, filed on May 17, 2021, which claims priority to Chinese Patent Application No. 202010485581.8, filed with the Chinese Patent Office on Jun. 1, 2020, entitled "CELL BALANCING DEVICE BASED ON CAPACITOR NETWORK, CASCADABLE BALANCED BATTERY PACK AND CONTROL METHOD THEREOF", the entire contents of the above identified applications are incorporated herein by reference.

TECHNICAL FIELD

The present application belongs to the technical field of charge control, in particular relates to a cell balancing device based on a capacitor network, a cascadable balanced battery pack and a control method thereof.

BACKGROUND ART

At present, electric equipment, such as an electric automobile and an automobile starting battery, has been widely applied to the market, and the electric equipment is based on chargeable/dischargeable battery packs connected in series and is particularly based on a power lead-acid battery pack and a lithium battery pack which have a high/low voltage and a high current. In order to acquire a certain output voltage and power, equipment supplied by a battery is generally formed by connecting a plurality of battery units in series or in parallel. However, due to differences in capacities of the battery units, they cannot be fully charged at the same time when being connected in series for charge and cannot be fully discharged at the same time during discharge, which causes the reduction of the available capacity of the battery packs, and therefore, with the aging of the batteries, the phenomenon that the units are unbalanced is more prominent. In the past when lead-acid batteries are used, the battery packs are infrequently charged and discharged during use, the unbalance of the battery units does not cause serious influences on the battery packs, there are no urgent demands thereon, and therefore, there is not much research. With the emergence of the electric automobile, the applications of the battery packs are changed, frequent and deep charge and discharge are required, and thus, there is a surging demand on the technical field of balance.

During charge, in order to fully charge each unit cell, a charge balancing circuit is generally adopted. When the battery units are to be fully charged, a charging current of a high-voltage unit is reduced or the high-voltage unit is discharged to reduce the charging speed and prolong the charging time, so that the low-voltage unit acquires more power until all the units are charged to a charge cut-off voltage. In order to fully discharge each battery unit during battery discharge, an active component (also referred to as an active element) balancing circuit is generally adopted, low-voltage battery units are charged by using energy of high-voltage battery units or the battery packs, and all the battery units are fully discharged at the same time, so that the available capacity is increased.

In the prior art, the battery packs generally achieve balance by adopting a passive component (also referred to as a passive element), such as a power resistor, to discharge. During charge, when the charging voltage of each cell unit is higher than a certain value, cell units overhigh in charging voltages are shunt by the resistor, so that cell units lower in charging voltages are further charged until they are charged to the charge cut-off voltage. Due to heat generation and energy consumption, generally, such a circuit is only used for charge balance; and meanwhile, the current cannot be overhigh, the balancing ability is limited, balanced charging time is long, and therefore, the effect is unsatisfactory. There is also a charge/discharge balancing circuit adopting the active component, such as a switch capacitor balancing circuit, a switched inductor balancing circuit, a multi-module switch selection balancing circuit, a multi-winding transformer balancing circuit and a bidirectional DC-DC converter balancing circuit, wherein the switch capacitor balancing circuit is especially worthy of studying due to small size, light weight, low cost, low heat yield, good electromagnetic compatibility and reliable performance. However, a switch control part of an energy storage capacitor in the structure of the switch capacitor balancing circuit is relatively complex, the direct-current level of a driven switch circuit is inconsistent, some patent technologies only stay in the use of computer software simulation drive, but actual circuit applications are not achieved. In traditional technologies, a single chip microcomputer is mainly adopted to output a control signal, and an optical coupler or a pulse transformer is coupled to make a response to level shifting and drive a MOSFET switch, thereby achieving a balancing function; and a mechanical switch, such as a relay, may also be adopted to achieve level shifting and switching, but it has the defects such as low working frequency, low balancing efficiency, large size and high cost.

SUMMARY

In order to solve the above-mentioned technical problems, the present application provides a cell balancing device based on a capacitor network, a cascadable balanced battery pack and a control method thereof.

In order to achieve the above-mentioned objectives, in one aspect, the present application provides a cell balancing device based on a capacitor network, which is used for balance control on a battery pack, the battery pack comprises n battery units B1, B2, ..., Bn connected in series, and the cell balancing device comprises:

n half-bridge circuits, two ends of each half-bridge circuit being connected in parallel to two ends of a battery unit in the battery pack, and each of the half-bridge circuits comprising two switch transistors connected in series;

an energy storage capacitor network comprising a basic energy storage capacitor network formed by connecting n−1 switch capacitors C1, C2, ..., Cn−1 in series, and the switch capacitors C1, C2, ..., Cn−1 being sequentially connected in parallel between every two midpoints of the n half-bridge circuits;

a chain-type driving capacitor network, with one end being electrically connected to the half-bridge circuits or the energy storage capacitor network, and an other end being electrically connected to a drive-pulse generator, and the chain-type driving capacitor network comprising n driving capacitors sequentially connected in series or in parallel to form a chain-type structure; and a control logic circuit electrically connected to the battery pack, the drive-pulse generator and a master control panel and configured to detect a voltage of the battery pack or voltages of the battery units thereof and control enable, frequency and a power switch of the drive-pulse generator as well as a power switch so that the energy consumption is reduced;

wherein n is a positive integer.

In some embodiments, the energy storage capacitor network further comprises a multilayer chain-type energy storage capacitor network, and the multilayer chain-type energy storage capacitor network comprises switch capacitors $C_{n+1}$, $C_{n+2}$, $C_{2n-2}$, wherein the switch capacitors $C_{n+1}$, $C_{n+2}$, $C_{2n-2}$ and the basic energy storage capacitor network form a pyramidic chain-type energy storage capacitor network.

In some embodiments, the energy storage capacitor network further comprises a multilayer chain-type energy storage capacitor network, and the multilayer chain-type energy storage capacitor network comprises n−1 switch capacitors $C_{n+1}$, $C_{n+2}$, $C_{2n-1}$, wherein the switch capacitors $C_{n+1}$, $C_{n+2}$, $C_{2n-1}$ and the basic energy storage capacitor network $C_1$, $C_2$, ..., $C_{n-1}$ form a pyramidic chain-type energy storage capacitor network.

In some embodiments, the drive-pulse generator adopts, but is not limited to a self-oscillator, a 555 timer, a PWM controller, a single chip microprocessor or a special half-bridge driver IC, the drive-pulse generator has an enable control end and/or a frequency control end so as to generate a drive-pulse signal, and the drive-pulse signal is a square-wave pulse having a duty ratio of 50% or a pair of complementary square-wave pulses having the same polarity or opposite polarities and a duty ratio approximate to 50% and having dead time.

In some embodiments, the control logic circuit controls to a power supply or the enable of the drive-pulse generator to be cut off to make the drive-pulse generator enter a standby state within a range of a normal battery working voltage Vop and a discharge overvoltage state.

In some embodiments of the present application, the control logic circuit is integrated with a charge/discharge protection circuit, and the charge/discharge protection circuit comprises:

at least one set of input voltage detectors, the input voltage detectors comprising a charge overvoltage detector, a discharge overvoltage detector, a charge balance detector and a discharge balance detector and being configured to acquire voltage information of the battery units and/or the battery pack and output the voltage information to the control logic circuit so as to output corresponding balance control signals;

each of the charge overvoltage detector OC DET, the discharge overvoltage detector OD DET, the charge balance detector BU DET and the discharge balance detector BL DET adopts a voltage comparator with micro-power consumption and high precision.

In another aspect, the present application provides a cascadable balanced battery pack adopting the above-mentioned cell balancing device based on the capacitor network, wherein each of the battery units comprises at least one of a cell unit having a unit voltage, a composite cell unit formed by connecting cell units in parallel and a high-voltage battery pack unit formed by connecting cell units in series;

a plurality of battery packs are sequentially connected in series via a cascade interface circuit to form a cascadable balanced long-string battery pack, when the cell balancing device works, a battery pack transfers power to a previous cascaded battery pack via the cascade interface circuit, and meanwhile, the cell balancing device of the previous cascaded battery pack is started via a cascade enable control circuit to form a long-string battery pack provided with an active balancing device, so that voltage balance control among all the cascaded battery packs is achieved.

In some embodiments, the cascade interface circuit comprises a balance control enable EN end, a unit voltage cascade interface and/or a battery pack voltage cascade interface;

the balance control enable EN end comprises the cascade enable control circuit which comprises an input end EN/I and an output end EN/O, and the balance control enable EN end is configured to forcedly start the cell balancing device when the battery pack or the cell units enter a charge overvoltage stage OC or a discharge overvoltage state OD, and meanwhile, a voltage of the battery pack or voltages of the cell units are not lower than a discharge balance stopping voltage $V_{BDL}$;

the unit voltage cascade interface is configured to achieve charge balance of the cell units in the cascadable balanced battery pack and charge/discharge balance in the high-voltage battery pack unit; and the battery pack voltage cascade interface is configured to achieve voltage balance among the cascaded battery packs in the long-string battery pack.

In some embodiments, the unit voltage cascade interface comprises:

a low-voltage cascade balancing circuit comprising an auxiliary energy storage capacitor CB;

an interface half-bridge circuit electrically connected to the switch capacitor $C_{n-1}$ of the basic energy storage capacitor network via a switch capacitor $C_n$ and comprising two switch transistors; and at least one low-voltage cascade driving capacitor network electrically connected to the interface half-bridge circuit, one of the half-bridge circuits and the chain-type driving capacitor network, and each low-voltage cascade driving capacitor network at least comprising a driving resistor and a driving capacitor;

wherein an interface end $B_{n+1}$ of the unit voltage cascade interface is electrically connected to a positive electrode B+ of the battery pack via the auxiliary energy storage capacitor CB, and meanwhile, two ends of the auxiliary energy storage capacitor CB are further connected in parallel to the interface half-bridge circuit; and the positive electrode B+ of the battery pack is connected to a negative electrode B− of the previous cascaded battery pack, and the interface end $B_{n+1}$ is connected to a positive electrode of a first battery unit of the previous cascaded battery pack.

In some embodiments, the unit voltage cascade interface comprises:

an interface half-bridge circuit electrically connected to the switch capacitor $C_{n-1}$ of the basic energy storage capacitor network via a switch capacitor $C_n$ and comprising two switch transistors; and at least one low-voltage cascade driving capacitor network electrically connected to the interface half-bridge circuit, one of the half-bridge circuits and the chain-type driving capacitor network, and each low-voltage cascade driving capacitor network at least comprising a driving resistor and/or a driving capacitor;

wherein a positive electrode B+ of the battery pack is connected to a negative electrode B− of the previous cascaded battery pack, and the interface end $B_{n+1}$ is connected to a positive electrode of a first battery unit of the previous cascaded battery pack.

In some embodiments, the battery pack voltage cascade interface comprises:

a high-voltage cascade balancing circuit further comprising a high-voltage auxiliary energy storage capacitor CB;

a high-voltage group half-bridge circuit at least comprising two switch transistors;

a low-voltage group half-bridge circuit with two ends being connected in parallel to the battery pack, and the low-voltage group half-bridge circuit at least comprising two switch transistors connected in parallel to the positive electrode and a negative electrode of the battery pack; and a high-voltage cascade driving resistor-capacitor network electrically connected to the high-voltage group half-bridge circuit, the low-voltage group half-bridge circuit and the chain-type driving capacitor network, and each high-voltage cascade driving resistor-capacitor network at least comprising a driving resistor and/or a driving capacitor;

wherein an interface end B2n of the battery pack voltage cascade interface is electrically connected to the positive electrode B+ of the battery pack via the high-voltage auxiliary energy storage capacitor CB and is electrically connected to the positive electrode B+ of the battery pack at the same time via the high-voltage group half-bridge circuit; and the interface end B2n is further connected to a positive electrode of the previous cascaded battery pack.

In some embodiments, the battery pack voltage cascade interface comprises:

a high-voltage cascade balancing circuit comprising a high-voltage auxiliary energy storage capacitor CB and a high-voltage balanced energy storage capacitor Cb;

a high-voltage group half-bridge circuit at least comprising two switch transistors, and two ends of the high-voltage group half-bridge circuit being connected in parallel to the high-voltage auxiliary energy storage capacitor CB; and a low-voltage group half-bridge circuit at least comprising two switch transistors, and two ends of the low-voltage group half-bridge circuit being connected in parallel to the positive electrode and a negative electrode of the battery pack;

wherein, the high-voltage balanced energy storage capacitor Cb is electrically connected to a midpoint of the high-voltage group half-bridge circuit and a midpoint of the low-voltage group half-bridge circuit; and a cascade driving resistor-capacitor network electrically connected to the high-voltage group half-bridge circuit, the low-voltage group half-bridge circuit and the chain-type driving capacitor network, and each cascade driving resistor-capacitor network at least comprising a driving resistor and/or a driving capacitor;

wherein an interface end B2n of the battery pack voltage cascade interface is electrically connected to the positive electrode B+ of the battery pack via the high-voltage auxiliary energy storage capacitor CB and is electrically connected to the positive electrode B+ of the battery pack at the same time via the high-voltage group half-bridge circuit; and the interface end B2n is further connected to a positive electrode of the previous cascaded battery pack.

In further aspect, the present application further provides a balance control method based on a capacitor network, which is based on the above-mentioned cascadable balanced battery pack provided with the cell balancing device; the control method comprises:

when a voltage of the battery pack is higher than a preset charge balance starting voltage $V_{BCH}$ and/or lower than a discharge balance starting voltage $V_{BDH}$, supplying power for the drive-pulse generator or generating enable to make the drive-pulse generator output a drive-pulse signal by the control logic circuit so that the cell balancing device is started; and when the voltage of the battery pack is lower than a charge balance stopping voltage $V_{BCL}$, lower than a discharge balance stopping voltage $V_{BDL}$ or higher than the discharge balance starting voltage $V_{BDH}$, cutting off the drive-pulse signal and stopping the cell balancing device by the control logic circuit.

In some embodiments, when the battery pack or the cell units enter the charge overvoltage state OC or the discharge overvoltage state OD, and meanwhile, the voltage of the battery pack or voltages of the cell units are not lower than the discharge balance stopping voltage $V_{BDL}$, starting the cell balancing device, otherwise, stopping the cell balancing device.

Compared with the prior art, the present application has the advantages and positive effects:

(1) the present application provides a cell balancing device based on a capacitor network, a cascadable balanced battery pack and a control method thereof, in which the driving capacitor network of the chain-type structure is adopted to achieve level shifting and driving functions, switch control on the energy storage capacitor network and the half-bridge circuits are achieved and simplified, simple square-wave pulse drive is used, and has the advantages of high working frequency and balancing efficiency, stable and reliable performance, small size and low cost.

(2) The energy storage capacitor network in the present application adopts a multilayer chain-type energy storage capacitor network which forms the pyramidic chain-type energy storage capacitor network together with the basic energy storage capacitor network, so that a charge transfer path can be shortened, the balancing circuit can be increased, and the balancing efficiency and speed can be increased.

(3) Meanwhile, in the present application, a balance control circuit with microwatt-level low power consumption is adopted to achieve enable or switching control on the pulse generator and enable the balancing circuit to be dormant or be turned off during normal voltage discharge, so that the static power consumption of a battery is reduced, the standby time of the battery is prolonged, and such a characteristic is especially important when being applied to the field of electric automobiles.

(4) The cell balancing device in the present application has the characteristic of cascade balance, is applicable to the voltage balance of the cell units in the battery pack, is also applicable to the balance among the cascaded battery pack units of the long-string battery pack formed by the high-voltage battery pack units, and satisfies the requirement on the balance of high-voltage battery packs.

(5) The cell balancing device in the present application is reasonable in circuit topological structure, prominent in balancing effect, reliable in performance, strong in universality and expandability, capable of conveniently achieving productization and module universalization, wide in application for the balance of the cell units of the battery pack and the balance among the cascaded battery pack units and applicable to a lead-acid battery pack and a lithium battery pack which are connected in series.

BRIEF DESCRIPTION OF DRAWINGS

To describe the technical solutions in the embodiments of the present application more clearly, the accompanying drawings required for describing the embodiments will be briefly introduced below. Apparently, the accompanying drawings in the following description show only some embodiments of the present application, and those of ordinary skill in the art may still derive other accompanying drawings from these accompanying drawings without creative efforts.

FIG. 1a and FIG. 1b are schematic diagrams showing a working principle of an energy storage capacitor network in an embodiment of the present application;

FIG. 2a is a schematic diagram showing a cell unit in an embodiment of the present application;

FIG. 2b is a schematic diagram showing a composite cell unit in an embodiment of the present application; and FIG. 2c is a schematic diagram showing a battery pack unit in an embodiment of the present application;

Figure 3:
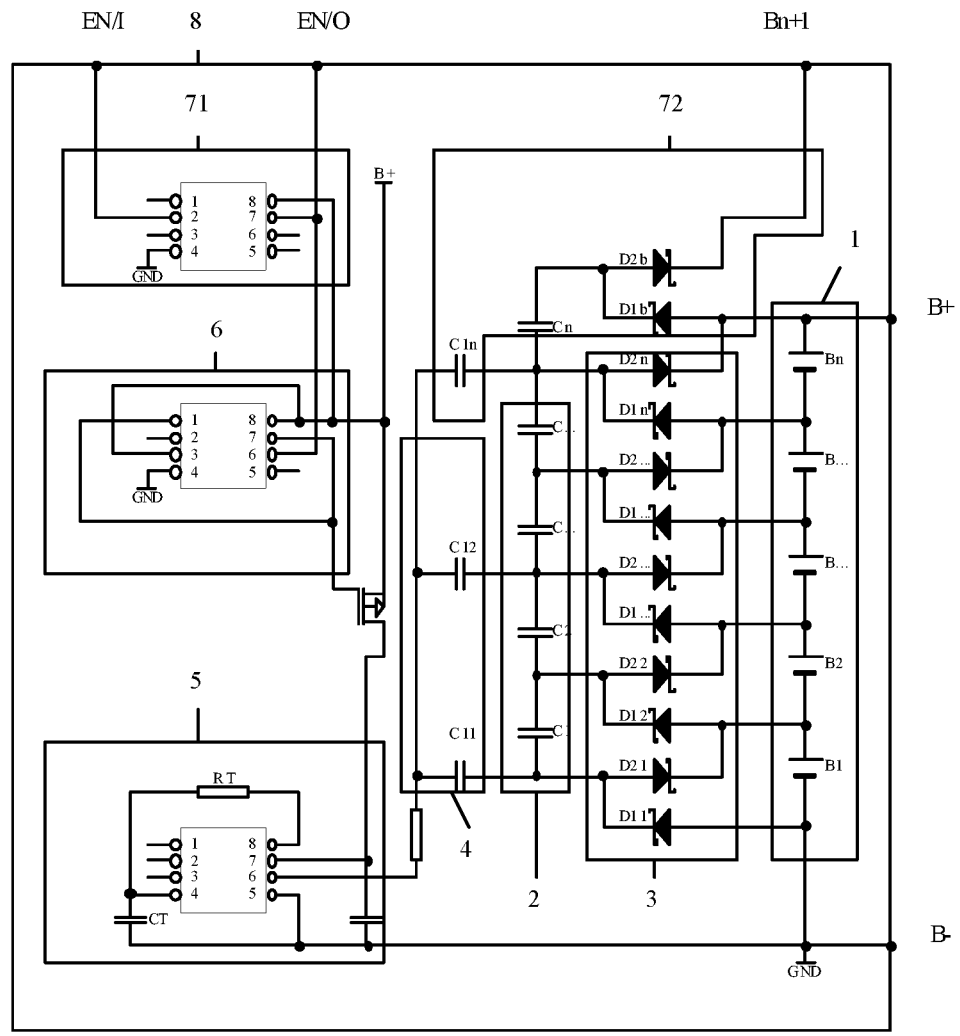
FIG. 3 is a schematic diagram showing a topological structure of a circuit of a cell balancing device adopting diodes as switch transistors in an embodiment of the present application.

In which:

1, battery pack; 2, energy storage capacitor network; 3, half-bridge circuit; 4, chain-type driving capacitor network; 5, drive-pulse generator; 6, control logic circuit; 71, balance control enable (EN) end; 72, unit voltage cascade interface; 73, battery pack voltage cascade interface; 8, cascadable balanced battery pack; and 9, charge/discharge protection circuit.

DETAILED DESCRIPTION OF THE EMBODIMENTS

The technical solutions in the embodiments of the present application will be clearly and completely described below with reference to the accompanying drawings in the embodiments of the present application. Apparently, the described embodiments may be only a part of the embodiments of the present application, but not all of the embodiments.

In the present application, "midpoint" specifically refers to a "middle end" of a combination of elements.

In one aspect, an embodiment of the present application provides a cell balancing device based on a capacitor network, which is used for balance control on a battery pack 1, the battery pack 1 comprises n battery units B1, B2, Bn connected in series, wherein n is a positive integer; the cell balancing device comprises:

n half-bridge circuits 3, two ends of each half-bridge circuit being connected in parallel to two ends of a battery unit in the battery pack, a midpoint of each half-bridge circuit being connected in parallel to a corresponding switch capacitor, each half-bridge circuit comprising two switch transistors connected in series, and each of the switch transistors adopting any one of a diode, a field-effect transistor (MOSFET) or an IGBT or a combination thereof to form a switch network of an energy storage capacitor;

an energy storage capacitor network 2 comprising a basic energy storage capacitor network formed by connecting the switch capacitors C1, C2, . . . , Cn−1 in series, and the switch capacitors C1, C2, . . . , Cn−1 being sequentially connected in parallel between every two midpoints of the n half-bridge circuits 3;

a chain-type driving capacitor network 4, with one end being electrically connected to the half-bridge circuits 3 or the energy storage capacitor network 2, and an other end being electrically connected to a drive-pulse generator 5, the chain-type driving capacitor network comprising n driving capacitors sequentially connected in series or in parallel to form a chain-type structure; and a control logic circuit 6 electrically connected to the battery pack 1, the drive-pulse generator 5 and a master control panel (i.e. a balance control enable EN end) and configured to detect a voltage of the battery pack 1 or voltages of the battery units thereof and control enable, frequency and a power switch of the drive-pulse generator 5 so that the energy consumption is reduced;

wherein the control logic circuit 6 determines balance enable and generates enable and frequency control signals according to voltage information of the battery pack and the battery units, so that the drive-pulse generator 5 outputs a required waveform to the chain-type driving capacitor network 4; by coupling the chain-type driving capacitor network 4 to the half-bridge circuits 3, upper and lower arms of the half-bridge circuits 3 are controlled to be turned on alternately, so that the energy storage capacitor network 2 and the connected battery units are turned on alternately; the battery units high in voltages in the battery pack 1 charge the capacitors in the energy storage capacitor network 2, so that the voltages are reduced; the battery units low in voltages get power from the energy storage capacitor network 2, so that the voltages of the battery units rise; and by such repetition, voltage balance of the battery units of the battery pack 1 is achieved.

In the above-mentioned embodiment, it should be noted that the number n of the above-mentioned driving capacitors is not necessarily same as the number n of the half-bridge circuits and is specifically determined according to different circuits. For examples, in some circuits, the number of the driving capacitors may be a half of the number of the half-bridge circuits.

The energy storage capacitor network 2 further comprises a multilayer chain-type energy storage capacitor network, which comprises 2n−1 switch capacitors Cn+1, Cn+2, C2n−2, wherein the switch capacitors Cn+1, Cn+2, C2n-2 and the basic energy storage capacitor network form a pyramidic chain-type energy storage capacitor network; a first layer of the pyramidic chain-type energy storage capacitor network is the basic energy storage capacitor network; switch capacitors of a second layer is connected in parallel to two ends of two or more switch capacitors, connected in series, of the basic energy storage capacitor network; switch capacitors of a third layer is connected in parallel to two ends of two or more switch capacitors, connected in series, of the second layer; in a similar way, formed is a pyramidic structure by which a charge transfer path can be shortened, the balancing circuit can be increased, and the balancing efficiency and speed can be increased.

The energy storage capacitor network 2 further comprises a multilayer chain-type energy storage capacitor network, which comprises n−1 switch capacitors Cn+1, Cn+2, C2n-1, wherein the switch capacitors Cn+1, Cn+2, C2n-1 and the basic energy storage capacitor network C1, C2, . . . , Cn−1 form a pyramidic chain-type energy storage capacitor network; a first layer of the pyramidic chain-type energy storage capacitor network is the basic energy storage capacitor network; switch capacitors of a second layer is connected in parallel to two ends of two or more switch capacitors, connected in series, of the basic energy storage capacitor network; switch capacitors of a third layer is connected in parallel to two ends of two or more switch capacitors, connected in series, of the second layer; in a similar way, formed is a pyramidic structure by which a charge transfer path can be shortened, the balancing circuit can be increased, and the balancing efficiency and speed can be increased.

The drive-pulse generator 5 adopts, but is not limited to a self-oscillator, a 555 timer, a PWM controller, a single chip microprocessor or a special half-bridge driver IC, the drive-pulse generator 5 has an enable control end and/or a frequency control end so as to generate a drive-pulse signal for driving the half-bridge circuits 3, and the drive-pulse signal is a square-wave pulse having a duty ratio of 50% or a pair of complementary square-wave pulses having the same polarity or opposite polarities and the duty ratio approximate to 50% and having dead time.

The control logic circuit 6 controls a power supply or the enable of the drive-pulse generator 5 to be cut off to make the drive-pulse generator 5 enter a standby state within a range of a normal battery working voltage Vop and a discharge overvoltage state. In the embodiments of the present application, the control logic circuit 6 adopts a microwatt-level low power consumption circuit and has an overdischarge dormancy function, so that the static power consumption is further reduced, and the standby time of a battery is prolonged.

The control logic circuit 6 is integrated with a charge/discharge protection circuit, the charge/discharge protection circuit comprises:

at least one set of input voltage detectors DET, the input voltage detectors DET comprising a charge overvoltage detector OC DET, a discharge overvoltage detector OD DET, a charge balance detector BU DET and a discharge balance detector BL DET, the input voltage detectors DET being configured to acquire voltage information of the battery units or the battery pack 1 and output the voltage information to the control logic circuit 6 so as to output corresponding balance control signals;

each of the charge overvoltage detector OC DET, the discharge overvoltage detector OD DET, the charge balance detector BU DET and the discharge balance detector BL DET adopts a voltage comparator with micro-power consumption and high precision;

wherein the micro-power consumption refers to microwatt-level low power consumption, and the high precision refers to millivolt-level high precision.

In another aspect, an embodiment of the present application discloses a cascadable balanced battery pack 8 adopting the above-mentioned cell balancing device based on the capacitor network, wherein, each of the battery units B1, B2, . . . , Bn comprises at least one of a cell unit having a unit voltage (as shown in FIG. 2a), a composite cell unit formed by connecting cell units in parallel (as shown in FIG. 2b) and a high-voltage battery pack unit formed by connecting cell units in series (as shown in FIG. 2c);

a plurality of battery packs 1 are sequentially connected in series via a cascade interface circuit to form a cascadable balanced long-string battery pack, when the cell balancing device works, a battery pack transfers power to a previous cascaded battery pack via the cascade interface circuit, and meanwhile, the cell balancing device of the previous cascaded battery pack is started via a cascade enable control circuit to form a long-string battery pack provided with an active balancing device, so that voltage balance control among all the cascaded battery packs is achieved.

The cascade interface circuit comprises a balance control enable EN end 71, a unit voltage cascade interface 72; the balance control enable EN end 71 comprises the cascade enable control circuit, and the cascade enable control circuit comprises an input end EN/I and an output end EN/O; when the battery pack or the cell units enter a charge overvoltage stage OC or a discharge overvoltage state OD, and meanwhile, the voltage of the battery pack or the voltages of the cell units are not lower than a discharge balance stopping voltage $V_{BDL}$, the cell balancing device is forcedly started by the balance control enable EN end.

In an embodiment of the unit voltage cascade interface 72, the unit voltage cascade interface 72 comprises: a low-voltage cascade balancing circuit comprising an auxiliary energy storage capacitor CB; an interface half-bridge circuit electrically connected to the switch capacitor Cn−1 of the basic energy storage capacitor network via a switch capacitor Cn and comprising two switch transistors; and at least one low-voltage cascade driving capacitor network electrically connected to the interface half-bridge circuit, one of the half-bridge circuits 3 and the chain-type driving capacitor network 4, and each low-voltage cascade driving capacitor network at least comprising a driving resistor and a driving capacitor;

wherein an interface end Bn+1 of the unit voltage cascade interface 72 is electrically connected to a positive electrode B+ of the battery pack via the auxiliary energy storage capacitor CB, and meanwhile, two ends of the auxiliary energy storage capacitor CB are further connected in parallel to the interface half-bridge circuit; and the positive electrode B+ of the battery pack is connected to a negative electrode B− of the previous cascaded battery pack, and the interface end Bn+1 is connected to a positive electrode of a first battery unit of the previous cascaded battery pack.

In another embodiment of the unit voltage cascade interface 72, the unit voltage cascade interface 72 comprises: an interface half-bridge circuit electrically connected to the switch capacitor Cn−1 of the basic energy storage capacitor network and comprising two switch transistors; and at least one low-voltage cascade driving capacitor network electrically connected to the interface half-bridge circuit, one of the half-bridge circuits 3 and the chain-type driving capacitor network 4, and each low-voltage cascade driving capacitor network at least comprising a driving resistor and/or a driving capacitor;

wherein the positive electrode B+ of the battery pack is connected to a negative electrode B− of the previous cascaded battery pack, and the interface end Bn+1 is connected to a positive electrode of a first battery unit of the previous cascaded battery pack.

The cascade interface circuit comprises a balance control enable EN end 71 and a battery pack voltage cascade interface 73. The battery pack voltage cascade interface 73 comprises:

a high-voltage cascade balancing circuit comprising a high-voltage auxiliary energy storage capacitor CB and a high-voltage balanced energy storage capacitor Cb;

a high-voltage group half-bridge circuit at least comprising two switch transistors, and two ends of the high-voltage group half-bridge circuit being connected in parallel to the high-voltage auxiliary energy storage capacitor CB; and a low-voltage group half-bridge circuit at least comprising two switch transistors, and two ends of the low-voltage group half-bridge circuit being connected in parallel to the positive and negative electrodes of the battery pack;

wherein, the high-voltage balanced energy storage capacitor Cb is electrically connected to a midpoint of the high-voltage group half-bridge circuit and a midpoint of the low-voltage group half-bridge circuit; and a cascade driving resistor-capacitor network electrically connected to the high-voltage group half-bridge circuit, the low-voltage group half-bridge circuit and the chain-type driving capacitor network, and each cascade driving resistor-capacitor network at least comprising a driving resistor and/or a driving capacitor;

wherein an interface end B2n of the battery pack voltage cascade interface is electrically connected to the positive electrode B+ of the battery pack via the high-voltage auxiliary energy storage capacitor CB and is electrically connected to the positive electrode B+ of the battery pack at the same time via the high-voltage group half-bridge circuit; and the interface end B2n is further connected to the positive electrode of the previous cascaded battery pack.

In further aspect, an embodiment of the present application further discloses a balance control method based on a capacitor network, which is based on the above-mentioned cascadable balanced battery pack 8 provided with the cell balancing device. The control method comprises:

(1) when a voltage of a battery is higher than a preset charge balance starting voltage $V_{BCH}$ (lower than an overcharge protection voltage $V_{OC}$) and/or lower than a discharge balance starting voltage $V_{BDH}$, starting the drive-pulse generator 5 to output drive pulse so that the cell balancing device is started;

(2) when the voltage of the battery is lower than a charge balance stopping voltage $V_{BCL}$ ($<V_{BCH}$), lower than a discharge balance stopping voltage $V_{BDL}$ (not lower than a cell overdischarge protection voltage VOD, but lower than the discharge balance starting voltage $V_{BDH}$) or higher than the discharge balance starting voltage $V_{BDH}$ (not lower than an overdischarge protection release voltage $V_{ODR}$), stopping balance, wherein $V_{OC} \geq V_{BCH} \geq V_{BCL} \geq V_{OP} \geq V_{BDH} \geq V_{ODR} \geq V_{BDL} \geq V_{OD}$; and (3) when the battery pack or the cell units enter the charge overvoltage state OC or the discharge overvoltage state OD, and meanwhile, the voltage of the battery pack or the voltages of the cell units are not lower than the discharge balance stopping voltage $V_{BDL}$, starting the cell balancing device, otherwise, stopping the cell balancing device.

FIG. 1a and FIG. 1b are schematic diagrams showing a working principle of the energy storage capacitor network in an embodiment of the present application. For simplifying the description, single-pole double-throw switches are adopted to achieve the switching effects of the above-mentioned half-bridge circuits. Each of two ends of each of the battery units is connected to one end of a single-pole double-throw switch, and the other end of the single-pole double-throw switch is connected to a switch capacitor, wherein the battery pack comprises four battery units connected in series.

The energy storage capacitor network shown in FIG. 1a is formed by connecting three switch capacitors C1, C2 and C3 in series and achieves voltage balance in a principle described as follows:

(1) when the single-pole double-throw switches are thrown to the positive electrodes of the battery units to turn on upper arms SWX-1 of the single-pole double-throw switches, wherein X=1, 2, 3 and 4, the switch capacitors C1, C2 and C3 respectively exchange charges with battery units B2, B3 and B4, so that voltages on two ends of the switch capacitors C1, C2 and C3 are equal to voltages of the battery units B2, B3 and B4, that is, $V_{C1}=V_{B2}$, $V_{C2}=V_{B3}$, and $V_{C3}=V_{B4}$; and (2) when the switches are thrown to the negative electrodes of the battery units to turn on lower arms SWX-2 of the single-pole double-throw switches, wherein X=1, 2, 3 and 4, the switch capacitors C1, C2 and C3 respectively exchange charges with battery units B1, B2 and B3; if the voltage of the battery unit B1 is lower than the voltage of the switch capacitor C1, i.e. $V_{B1}<V_{C1}=V_{B2}$, the switch capacitor C1 charges the battery unit B1, so that the voltage $V_{C1}$ of the switch capacitor C1 is reduced, and the voltage $V_{B1}$ of the battery unit B1 rises until they are equal; and if the voltage of the battery unit B1 is higher than the voltage of the switch capacitor C1, i.e. $V_{B1}>V_{C1}=V_{B2}$, the battery unit B1 charges the switch capacitor C1, so that the voltage $V_{C1}$ of the switch capacitor C1 rises, and the voltage $V_{B1}$ of the battery unit B1 is reduced until they are equal.

The upper arms SWX-1 and the lower arms SWX-2 of the above-mentioned single-pole double-throw switches are alternately turned on once, the power transferred by C1 is expressed as: $Q=C \times \Delta V_{C1}=C \times (V_{B2}-V_{B1})$, wherein C is a capacity of the capacitor; and by repeated charge transfer of C1, the voltage of the battery unit B1 and the voltage of the battery unit B2 are approximately equal, and a voltage difference $\Delta V_{C1}$ of the battery units is expressed as: $\Delta V_{C1}=V_{B2}-V_{B1}=0$; and accordingly, a balanced current is equal to $Q/t=C \times \Delta V_{C1} \times f$, wherein f is a switching frequency. Similarly, $V_{B2}=V_{B3}=V_{B4}$, finally, voltage balance between the adjacent battery units is achieved, and a balanced step length is 1.

FIG. 1b is a schematic diagram showing a working principle of the energy storage capacitor network applied to four battery units connected in series in an embodiment of the present application. As shown in FIG. 1b, on the basis of FIG. 1a, further comprises is a pyramidic chain-type energy storage capacitor network C4, C5, C6 and C7 and the unit voltage cascade interface, the pyramidic chain-type energy storage capacitor network comprises the switch capacitors C5 and C6 with the step length being 2 and the switch capacitor C7 with the step length being 4, a first layer is the basic energy storage capacitor network in FIG. 1a, a second layer of switch capacitors C5 and C6 is respectively connected in parallel to two ends of the switch capacitors C1, C2 and two ends of the switch capacitors C3, C4, and a third layer of switch capacitor C7 is connected in parallel to two ends of the second layer of switch capacitors C5 and C6; and the unit voltage cascade interface in FIG. 1b comprises an auxiliary energy storage capacitor CB, a single-pole double-throw switch SW5 and a driver thereof as well as an interface end B5 (i.e. Bn+1); the single-pole double-throw switch SW5 is configured to achieve a switching effect of the interface half-bridge circuit in the unit voltage cascade interface; one end of the auxiliary energy storage capacitor CB is connected to the positive electrode B+ of the battery pack, the positive electrode B+ of the battery pack is connected to the negative electrode B− of the previous cascaded battery pack, the other end B5 (Bn+1), i.e. the interface end Bn+1, of the auxiliary energy storage capacitor CB is connected to the positive electrode of a first battery unit B1 on the negative electrode of the previous cascaded battery pack, that is, the auxiliary energy storage capacitor CB is connected in parallel to two ends of the first battery unit on the negative electrode end of the previous cascaded battery pack, and the auxiliary energy storage capacitor CB is configured to optimize electromagnetic interference. An upper arm SW5-1 of the single-pole double-throw switch SW5 is connected to the interface end B5 (Bn+1), a lower arm SW5-2 thereof is connected to the positive electrode B+ of the battery pack, a midpoint of the single-pole double-throw switch SW5 is connected to the energy storage capacitor network, and the single-pole double-throw switch SW5 is connected to the chain-type driving capacitor network. When not used for cascade, the unit voltage cascade interface may also be used as the [5(n+1)]th balancing unit interface for balancing a battery pack with 5(n+1) battery units.

At the moment when the upper arm SW5-1 of the single-pole double-throw switch SW5 is turned on (is synchronized with SW1-SW4), it is equivalent that an upper arm of the interface half-bridge circuit of the above-mentioned unit voltage cascade interface is turned on, the energy storage capacitor network is connected in parallel to the battery unit corresponding to the upper arm SW5-1 and the auxiliary energy storage capacitor CB to complete charge exchange; when the lower arm SW5-2 is turned on, the energy storage capacitor network is connected in parallel to the battery unit corresponding to the lower arm SW5-2 to complete charge exchange; the upper arm and the lower arm are turned on alternately, so that charges flow between the energy storage capacitor network and each of the battery units to form a balanced current; and by such repetition, voltages of the battery units are approximately equal, and thus, balance is completed, wherein a voltage difference of two ends of the capacitor C5 is expressed as:

$\Delta V_{C5} = (V_{B3}+V_{B2}) - (V_{B2}+V_{B1}) = V_{B3}-V_{B1}$, by which voltage balance between the battery units B1 and B3 can be achieved;

a voltage difference of two ends of the capacitor C7 is expressed as:

$\Delta V_{C7} = (V_{CB}+V_{B4}+V_{B3}+V_{B2}) - (V_{B4}+V_{B3}+V_{B2}+V_{B1})$
$= V_{CB}-V_{B1}$, by which voltage balance between the battery unit B1 and the auxiliary energy storage capacitor CB (i.e. a battery unit B1 of the previous battery pack) can be achieved; and a voltage difference of two ends of the capacitor C6 is expressed as:

$\Delta V_{C6} = (V_{CB}+V_{B4}) - (V_{B3}+V_{B4}) = V_{CB}-V_{B3}$, by which voltage balance between the battery unit B3 and the cascaded auxiliary energy storage capacitor CB (i.e. a battery unit B1 of the previous battery pack) can be achieved.

Compared with the basic energy storage capacitor network, the multilayer chain-type energy storage capacitor network with any step length provides additional balanced current channels, by which the balancing efficiency can be effectively increased, the balancing time can be shortened, and inter cascade balance can be achieved. The step length may select common divisors or the number of the cascades of the battery units connected in series, such as a common pyramidic structure consisting of $2n-1$ capacitors 1, 2, 4, 8, . . . , so that the uniform balancing effect is improved.

Therefore, the cascadable balanced battery pack provided in the embodiment of the present application can effectively increase the balancing efficiency and shorten the balancing time, and the balanced current is determined by the capacity of each of the switch capacitors and the switching frequency f. In order to satisfy the requirement of the balanced current, the switching frequency f of the switch capacitor has to be increased without remarkably improving the capacity (i.e. cost) of the switch capacitor.

The present application will be described below by adopting specific embodiments of different implementations.

Embodiment 1

In the present embodiment, an implementation in which diodes are adopted as switch transistors is adopted, and the specific solution is described as follows:

FIG. 3 is a schematic diagram showing a topological structure of a cascadable balanced battery pack in the present embodiment. As shown in FIG. 3, the cascadable balanced battery pack 8 comprises: a battery pack 1 formed by connecting n battery units B1, B2, . . . , Bn with the same size in series, an energy storage capacitor network 2 comprising n capacitors C1, C2, . . . , Cn−1, n half-bridge circuits, a chain-type driving capacitor network 4 comprising n/2 driving capacitors sequentially connected in parallel, a drive-pulse generator 5 and a control logic circuit 6 thereof; the diodes are adopted as the switch transistors of the half-bridge circuits, and each of the battery units is correspondingly connected to one of the half-bridge circuits, wherein D1X is a lower arm of a half-bridge circuit, D2X is an upper arm of the half-bridge circuit, and X=1, 2, . . . , n.

The cascade interface circuit of the battery pack 1 adopts the unit voltage cascade interface 72, and the unit voltage cascade interface 72 comprising an interface half-bridge circuit consisting of diodes D1b and D2b, and a midpoint of the interface half-bridge circuit is connected to the chain-type driving capacitor network 4 and the energy storage capacitor network 2; the chain-type driving capacitor network 4 comprises driving capacitors C11, C12, . . . , C1(n/2); and a lower end of the lower arm D1b of the interface half-bridge circuit is connected to a positive electrode B+ of the battery pack and a negative electrode of a previous cascaded battery pack, an upper end of the interface half-bridge circuit is an interface end Bn+1 and is connected to a positive electrode of a first battery unit on a negative electrode end of the previous cascaded battery pack.

Below, a working principle of the cell balancing device will be described in conjunction with different situations:

(1) under the condition that the voltage $V_{B1}$ of the battery unit B1 is higher than the voltage $V_{B2}$ of the battery unit B2, when the drive-pulse generator 5 outputs a low level, the lower arm D1X is turned on; and if the voltage $V_{CX}$ on a switch capacitor CX is lower than the voltage $V_{BX}$ of a battery unit BX, BX charges the switch capacitor CX, $V_{CX}$ rises, and $V_{BX}$ is reduced until they are equal. When the drive-pulse generator 5 outputs a high level, the upper arm D2X is turned on; if the voltage on the switch capacitor CX $V_{CX}=V_{BX}$ is higher than the voltage $V_{B(X+1)}$ of a battery unit B(X+1), the switch capacitor CX charges B(X+1), $V_{CX}$ is reduced, and $V_{B(X+1)}$ rises until they are equal; by such repetition, the battery unit BX charges B(X+1) via the switch capacitor CX, so that $V_{BX}$ is reduced, and $V_{B(X+1)}$ rises until they are equal.

(2) Under the condition that the voltage $V_{B1}$ of the battery unit B1 is lower than the voltage $V_{B2}$ of the battery unit B2, similarly, a battery unit B(X+1) charges BX via the switch capacitor CX, so that $V_{B(X+1)}$ is reduced, and $V_{BX}$ rises until they are equal. As above, the topological structure of the cascadable balanced battery pack adopting the diodes as the half-bridge circuits is simple and reliable, low in cost and applicable to a low-power application in which the balanced current is not high.

Figures 7A, 7B:
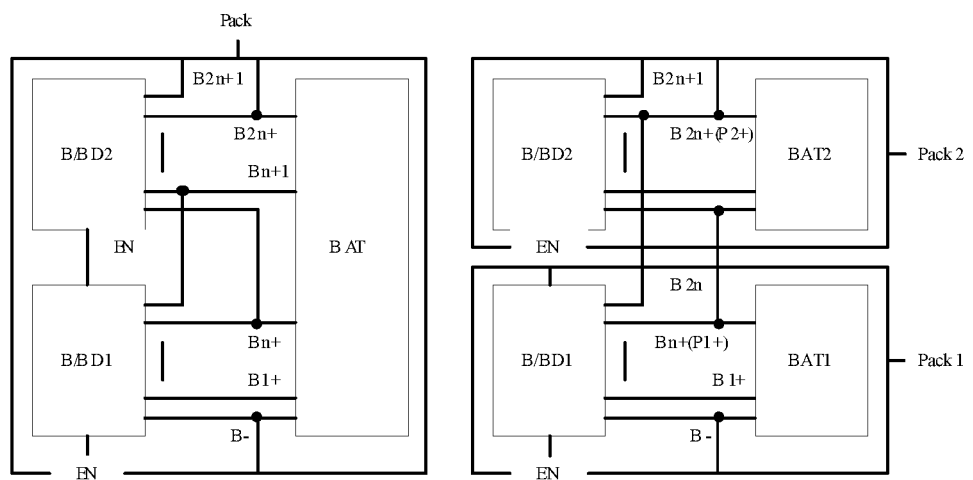
FIG. 7a to FIG. 7c are schematic diagrams showing wiring on a cascade interface in an embodiment of the present application.

FIG. 7a is a schematic diagram showing wiring on the unit voltage cascade interface configured to balance battery units cascaded in a Pack; each of B/BD1 and B/BD2 is the cell balancing device, the Pack is the battery pack 1, i.e. BAT, consisting of 2n battery units. B/BD1 is connected to the battery units B1, B2, . . . , Bn+1 in the battery pack in a one-to-one correspondence way, B− of B/BD2 is connected to the positive electrode of the battery unit Bn, B1 is connected to the positive electrode of the battery unit Bn+1, B2 is connected to the positive electrode of the battery unit Bn+2, Bn is connected to the battery unit B2n, and thus, the internal balance of the battery units is achieved.

Embodiment 2

Figure 4A:
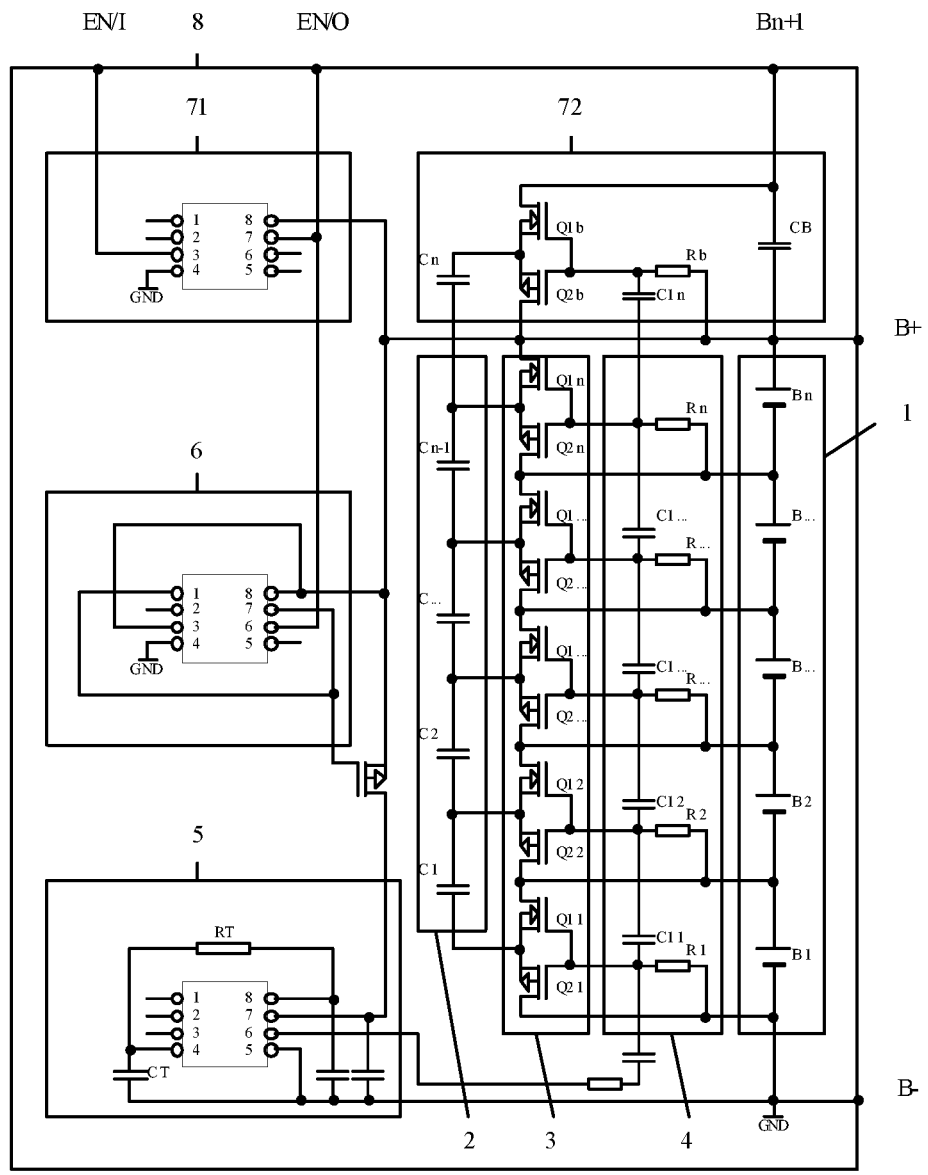
FIG. 4a to FIG. 4d are schematic diagram showing a topological structure of a circuit of a cell balancing device adopting field-effect transistors (MOSFETs) as switch transistors in an embodiment of the present application.

In the present embodiment, an implementation in which field-effect transistors (MOSFETs) are adopted as switch transistors is adopted, and the specific solution is described as follows:

FIG. 4a is a schematic diagram showing a topological structure of a cascadable balanced battery pack in the present embodiment. Below, differences of the present embodiment and embodiment 1 are described only, but similarities thereof will not be repeated again. As shown in FIG. 4a, the present embodiment differs from embodiment 1 shown in FIG. 3 in that:

in order to meet a high-power application, increase the balancing energy consumption ratio and solve the problems of driving and the balance of the balanced current, the diodes of the half-bridge circuits are replaced with the field-effect transistors (MOSFETs), thereby achieving synchronous switching and reducing the driving power as well as the switching and turning-on loss.

In the present embodiment, the MOSFETs with P+N channels are adopted as the switch transistors of the half-bridge circuits 3, wherein the switch transistor Q1X is an upper arm of a half-bridge circuit, and Q2X is a lower arm of the half-bridge circuit, wherein X=1 to n (the same below). Accordingly, the pulse generator outputs a square-wave driving pulse having the duty ratio of 50%, the half-bridge circuits share one chain-type driving capacitor network to transfer the square-wave driving pulse having the duty ratio of 50%, and a gate of each of the half-bridge circuits 3 is sequentially connected to the chain-type driving capacitor network 4.

The chain-type driving capacitor network 4 comprises n driving capacitors connected in series and a resistor to form a n-type network chain-type structure and is correspondingly electrically connected to the battery units to transfer received switching pulse symmetric in positive and negative electrodes and uniform in amplitude, thereby achieving driving control on the half-bridge circuits; one end of each of then driving capacitors, connected in series, of the chain-type driving capacitor network 4 is connected to the drive-pulse generator 5 for output, and the other end thereof is respectively connected to the gate of an upper half-bridge MOSFET and the gate of the lower half-bridge MOSFET and is connected to one of the battery units by a resistor so as to couple a switching signal output by the drive-pulse generator 5 to the gates of the MOSFETs; and the resistor is configured to balance direct-current levels of the gates of the MOSFETs.

The cascade interface is used for cascade and comprises a balance control enable EN end 71 and a unit voltage cascade interface 72. The unit voltage cascade interface 72 comprises switch transistors Q1b and Q2b which are respectively an upper arm and a lower arm of an interface half-bridge circuit of the unit voltage cascade interface, two ends of the switch transistors Q1b and Q2b are connected to an auxiliary energy storage capacitor CB, a driving resistor Rb and a driving capacitor C1n are used as a low-voltage cascade driving capacitor network, the interface half-bridge circuit is further connected to a battery unit Bn, and a midpoint of the interface half-bridge circuit is connected to the switch capacitor Cn−1 of the energy storage capacitor network 2.

A working principle of the cell balancing device in the present embodiment is described as follows:

situation 1: when the drive-pulse generator 5 outputs a low level, the lower arm Q2X is turned on, and a switch capacitor CX is connected in parallel to a battery unit BX; if the voltage $V_{CX}$ on the switch capacitor CX is lower than the voltage $V_{BX}$ of the battery unit BX, BX charges the switch capacitor CX, $V_{CX}$ rises, and $V_{BX}$ is reduced; otherwise, if the voltage $V_{CX}$ on the switch capacitor CX is higher than the voltage $V_{BX}$ of the battery unit BX, the switch capacitor CX charges BX, $V_{CX}$ is reduced, and $V_{BX}$ rises until $V_{CX}=V_{BX1}$;

situation 2: when the drive-pulse generator 5 outputs a high level, a half-bridge upper arm Q1X is turned on, and thus, the switch capacitor CX is connected in parallel to a battery unit B(X+1) and the auxiliary energy storage capacitor CB; if the voltage $V_{CX}$ on the switch capacitor CX is higher than the voltage $V_{B(X+1)}$ of the battery unit B(X+1), the capacitor CX charges B(X+1), $V_{CX}$ is reduced, and $V_{B(X+1)}$ rises; vice versa, until $V_{CX}=V_{B(X+1)}$; by such a cycle, the charge/discharge voltage of the switch capacitor CX is expressed as $\Delta V_C=V_{B(X+1)}-V_{BX}$, and the charge/discharge power is expressed as $Q=CX\times\Delta V_C$; and repetition is performed for several times until $V_{BX}=V_{B(X+1)}$.

Meanwhile, the balance control enable EN end 71 in the present embodiment comprises a cascade enable control circuit which comprises an input end EN/I and an output end EN/O, and the balance control enable EN end 71 is configured to forcedly start the cell balancing device when the battery pack or the cell units enter a charge overvoltage stage OC or a discharge overvoltage state OD, and meanwhile, the voltages of the battery pack or the voltages of the cell units are not lower than a discharge balance stopping voltage $V_{BDL}$; the input of EN/I is from a master control panel or a battery pack charge-discharge protection panel, and the output of EN/O is used for controlling a previous cascaded battery pack.

The unit voltage cascade interface 72 in the present embodiment comprises the auxiliary energy storage capacitor CB, the interface half-bridge circuit and the low-voltage cascade driving capacitor network; the interface half-bridge circuit comprises Q1b and Q2b; the low-voltage cascade driving capacitor network comprises the driving capacitor C1n and the driving resistor Rb; an interface end Bn+1 of the unit voltage cascade interface is connected to one end of the auxiliary energy storage capacitor CB, the other end of the auxiliary energy storage capacitor CB is connected to the positive electrode B+ of the battery pack, the interface end Bn+1 is further connected to an upper arm of the interface half-bridge circuit, and a lower arm of the interface half-bridge circuit is connected to the positive electrode B+ of the battery pack; a midpoint of the interface half-bridge circuit is connected to a capacitor Cn−1 of the energy storage network via a switch capacitor Cn; B+ of the interface circuit is connected to a negative electrode of the previous cascaded battery pack, and the interface end Bn+1 is connected to a positive electrode of a first battery unit of the previous cascaded battery pack; and therefore, a long-string battery pack provided with an active balancing device is formed.

Each MOSFET in the present embodiment is a voltage-type device of which the gate requires a very small driving current, so that the driving output pulse power is reduced; in addition, the turning-on loss of the switch transistors of the half-bridge circuits 3 is extremely low, so that a great balanced current can be provided, the balancing energy consumption ratio is optimized, and the requirement for a high-power balancing application can be satisfied. The battery pack in the present embodiment have a good balance characteristic and can be arbitrarily embedded and cascaded, the balancing circuit of each of cascaded battery packs works independently without interference with each other, and particularly, the cascade application adopting the multilayer chain-type energy storage capacitor network are especially applicable to a long-string high-voltage and high-power battery pack in occasions such as a power battery of an electric automobile due to high efficiency.

Embodiment 3

Figure 4B:
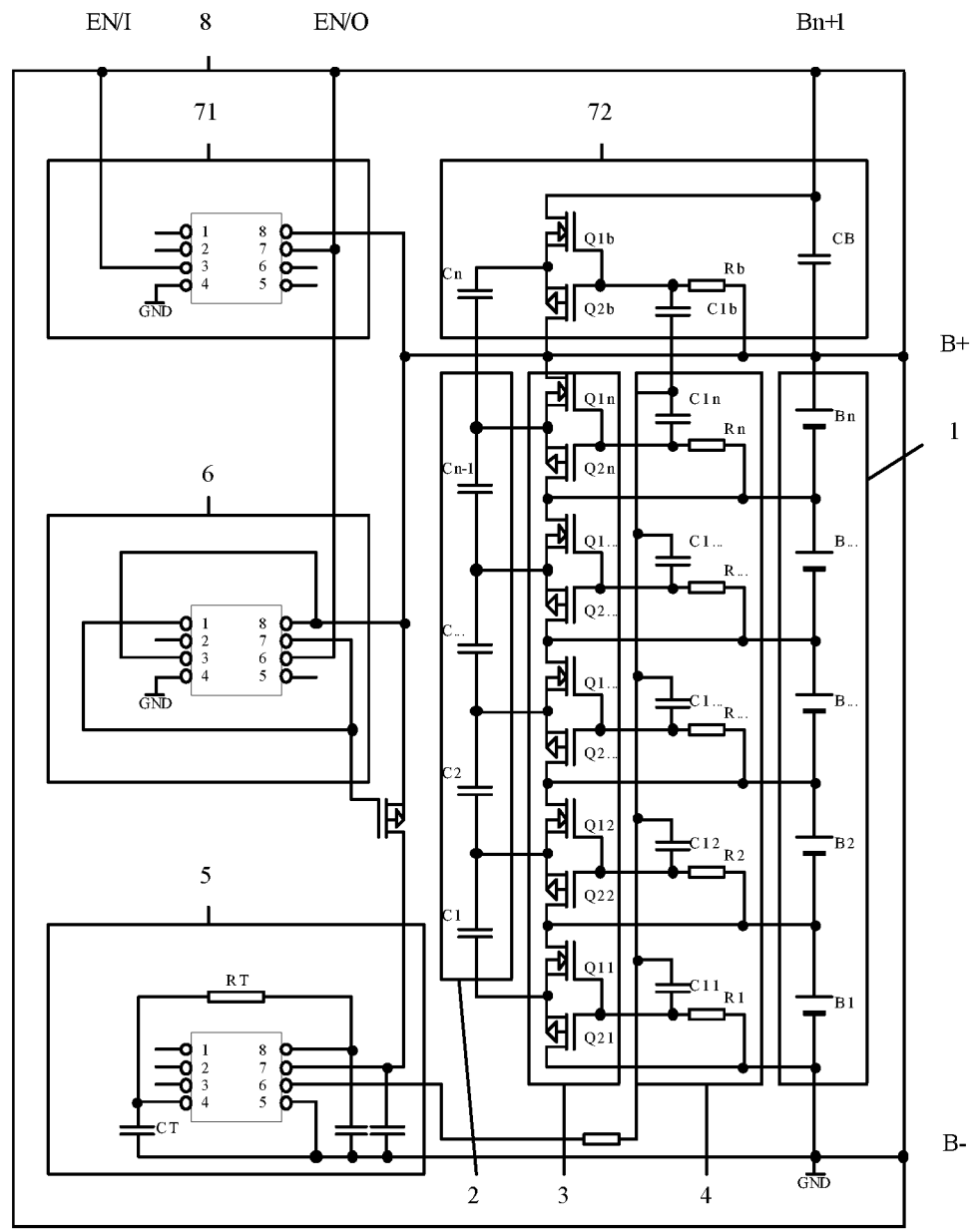

In the present embodiment, an implementation in which field-effect transistors (MOSFETs) are adopted as switch transistors is adopted, and the specific solution is described as follows:

FIG. 4b is a schematic diagram showing a topological structure of a cascadable balanced battery pack in the present embodiment. Below, differences of the present embodiment and embodiment 2 are described only, but similarities thereof will not be repeated again. As shown in FIG. 4b, the present embodiment differs from embodiment 2 shown in FIG. 4a in that:

the driving capacitors of the chain-type driving capacitor network 4 are directly connected between the gate of the MOSFET of each of the half-bridge circuits 3 and the output of the pulse generator, so that voltage stresses of the driving capacitors are increased.

Embodiment 4

Figure 4C:
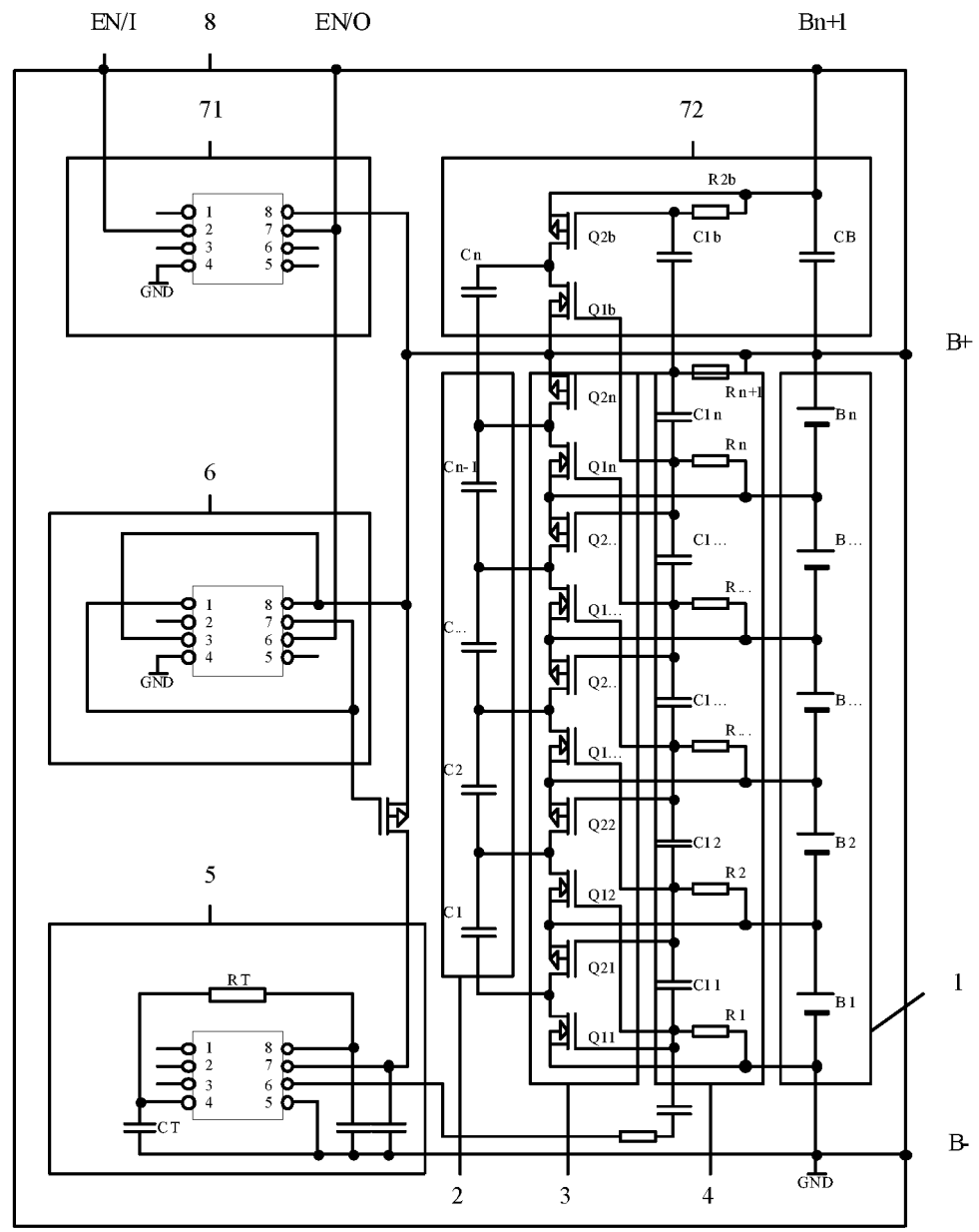

In the present embodiment, an implementation in which field-effect transistors (MOSFETs) are adopted as switch transistors is adopted, and the specific solution is described as follows:

FIG. 4c is a schematic diagram showing a topological structure of a cascadable balanced battery pack in the present embodiment. Below, differences of the present embodiment and embodiment 2 are described only, but similarities thereof will not be repeated again. As shown in FIG. 4c, the present embodiment differs from embodiment 2 shown in FIG. 4a in that:

in FIG. 4a, the upper arms of the half-bridge circuits 3 adopt MOSFETs with N channels, and the lower arms thereof adopt MOSFETs with P channels; however in FIG. 4c, upper arms adopt MOSFETs with P channels, and lower arms adopt MOSFETs with N channels. In order to obtain a correct direct-current bias, a resistor connection way of the chain-type driving capacitor network is adaptively changed.

Embodiment 5

Figure 4D:
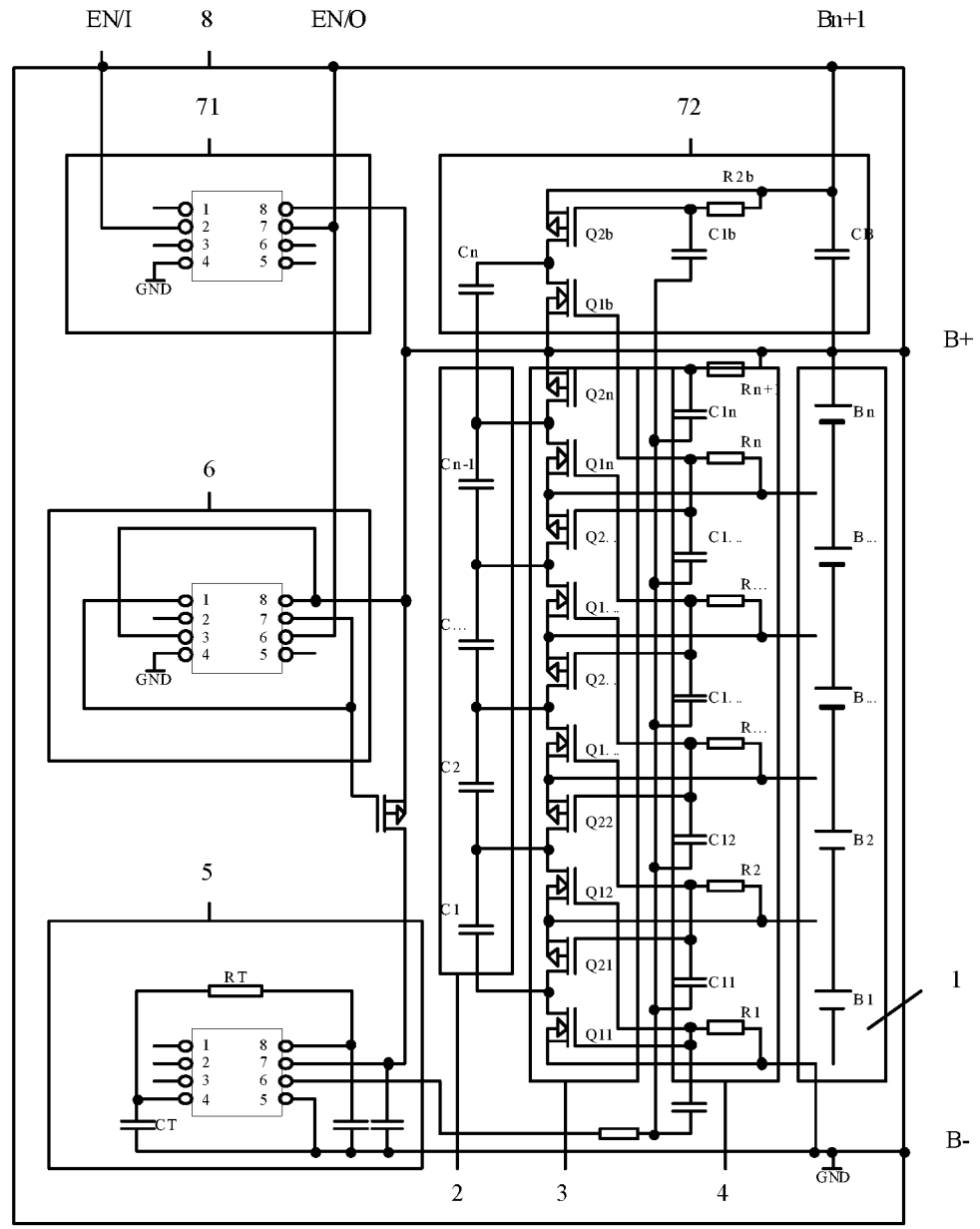

In the present embodiment, an implementation in which field-effect transistors (MOSFETs) are adopted as switch transistors is adopted, and the specific solution is described as follows:

FIG. 4d is a schematic diagram showing a topological structure of a cascadable balanced battery pack in the present embodiment. Below, differences of the present embodiment and embodiment 4 are described only, but similarities thereof will not be repeated again. As shown in FIG. 4d, the present embodiment differs from embodiment 4 shown in FIG. 4c in that:

the driving capacitors of the chain-type driving capacitor network 4 are directly connected between the gate of the MOSFET of each of the half-bridge circuits 3 and the output of the pulse generator, so that voltage stresses of the driving capacitors are increased.

Embodiment 6

Figure 5:
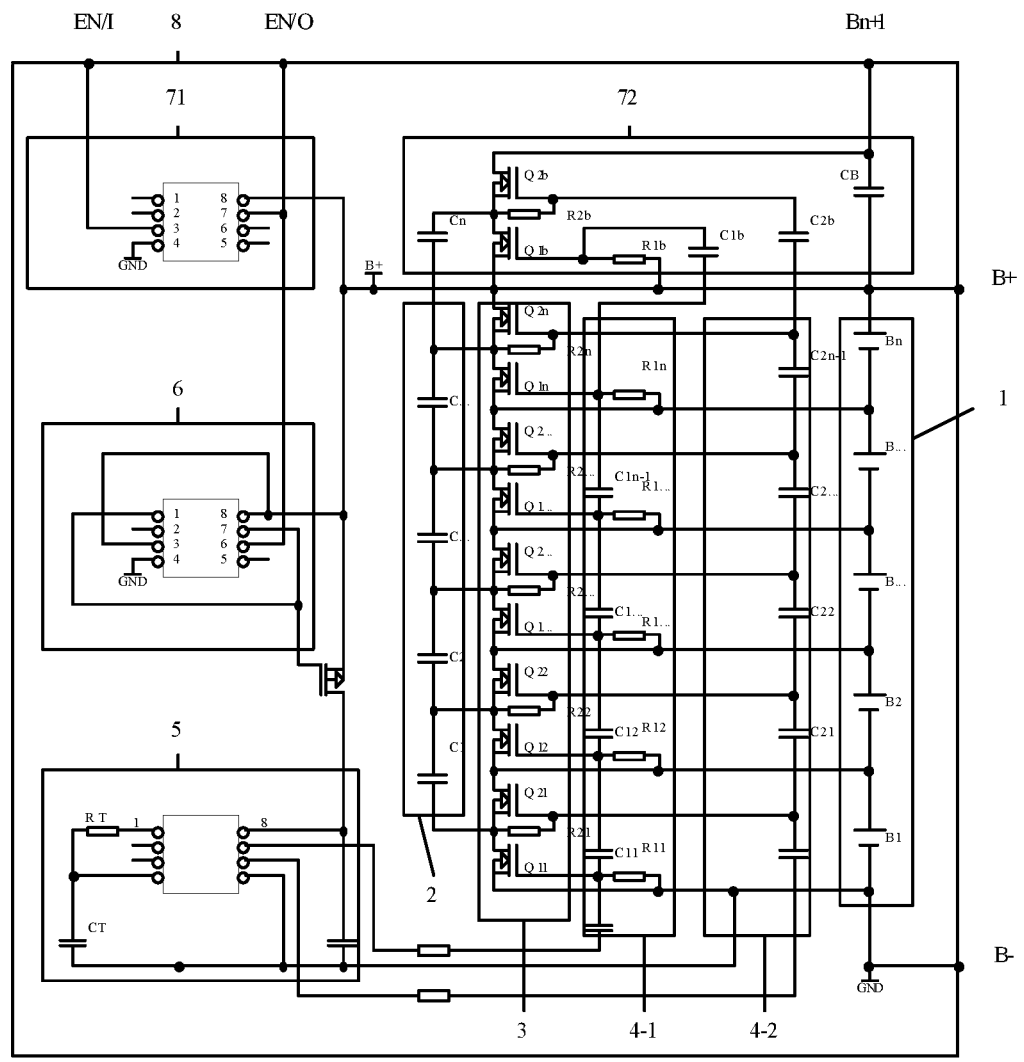
FIG. 5 is a schematic diagram showing another topological structure of a circuit of a cell balancing device adopting field-effect transistors (MOSFETs) as switch transistors in an embodiment of the present application.

In the present embodiment, an implementation in which field-effect transistors (MOSFETs) are adopted as switch transistors is adopted, and the specific solution is described as follows:

FIG. 5 is a schematic diagram showing a topological structure of a cascadable balanced battery pack in the present embodiment. Below, differences of the present embodiment and embodiments 2 to 5 are described only, but similarities thereof will not be repeated again. As shown in FIG. 5, the present embodiment differs from the embodiments shown in FIG. 4a to FIG. 4d in that:

the half-bridge circuits 3 thereof adopt two MOSFETs with the same type of channels, i.e. double MOSFETs with N channels, and accordingly, the pulse generator 5 outputs complementary square-wave pulses having the duty ratio approximate to 50% and having positive polarity to drive the half-bridge circuits 3.

The double MOSFETs with N channels may also adopt double MOSFETs with P channels, they have the same topological structure, and when the double MOSFETs with P channels are adopted, the pulse generator 5 outputs a square-wave pulse having the duty ratio approximate to 50% and having negative polarity.

In the present embodiment, the same type of MOSFETs are adopted as the switch transistors of the half-bridge circuits 3, so that the better consistency is achieved, and the production cost is reduced; and meanwhile, the battery pack in the present embodiment have a good balance characteristic and can be arbitrarily embedded and cascaded, the balancing circuit of each of cascaded battery packs works independently without interference with each other, and particularly, the cascade application adopting the multilayer chain-type energy storage capacitor network are especially applicable to a long-string high-voltage and high-power battery pack in occasions such as a power battery of an electric automobile due to high efficiency.

The half-bridge circuits 3 in FIG. 5 may also adopt a pair of complementary MOSFETs with N+P channels, and accordingly, the pulse generator outputs a pair of complementary pulses with opposite polarities, wherein a positive pulse drives the NMOSFET, and a negative pulse drives the PMOSFET.

Embodiment 7

In the present embodiment, another implementation in which a battery pack voltage cascade interface is used as the cascade interface is adopted on the basis of the above-mentioned embodiment. On this basis, FIG. 6 provides a schematic diagram showing a topological structure of a cascadable balanced battery pack.

Figure 6:
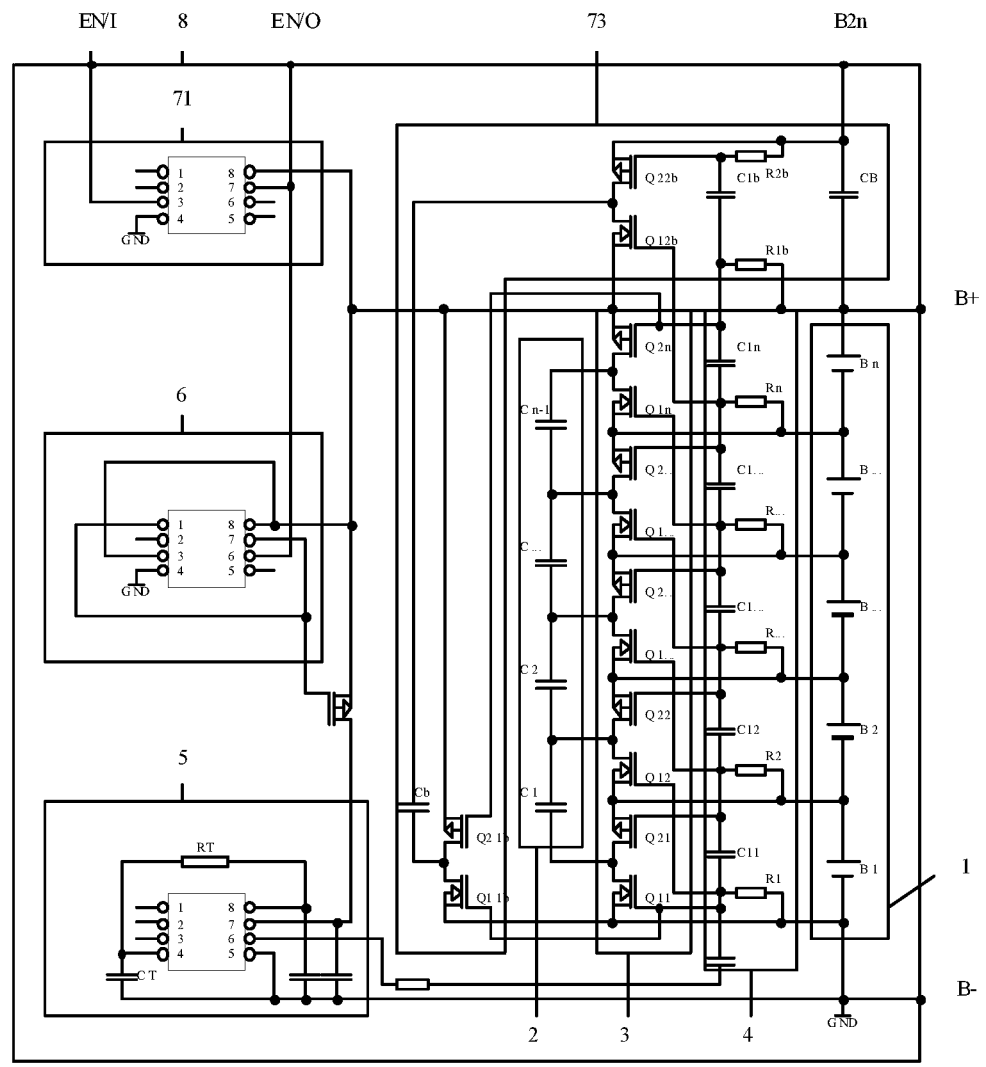
FIG. 6 is a schematic diagram showing a topological structure of a balancing circuit adopting a battery pack voltage cascade interface in an embodiment of the present application.

The embodiment shown in FIG. 6 differs from the embodiment shown in FIG. 4c in that:

the cascade interface adopts a battery pack voltage which is a high voltage solution, the cascade interface comprises a balance control enable EN end 71 and a battery pack voltage cascade interface 73; and the battery pack voltage cascade interface 73 comprises:

a high-voltage cascade balancing circuit comprising a high-voltage auxiliary energy storage capacitor CB and a high-voltage balanced energy storage capacitor Cb;

a high-voltage group half-bridge circuit at least comprising a switch transistor Q12b and a switch transistor Q22b, and two ends of the high-voltage group half-bridge circuit being connected in parallel to the high-voltage auxiliary energy storage capacitor CB;

a low-voltage group half-bridge circuit at least comprising a switch transistor Q11b and a switch transistor Q21b, and two ends of the low-voltage group half-bridge circuit being connected in parallel to the positive and negative electrodes of the battery pack; and a cascade driving resistor-capacitor network electrically connected to the high-voltage group half-bridge circuit, the low-voltage group half-bridge circuit 3 and the chain-type driving capacitor network 4, and each cascade driving resistor-capacitor network at least comprising a driving resistor R1b and a driving capacitor C1b;

wherein an interface end B2n of the battery pack voltage cascade interface 73 is electrically connected to the positive electrode B+ of the battery pack via the high-voltage auxiliary energy storage capacitor CB and is electrically connected to the positive electrode B+ of the battery pack at the same time via the high-voltage group half-bridge circuit; the interface end B2n is further connected to the positive electrode of the previous cascaded battery pack; and the high-voltage balanced energy storage capacitor CB is electrically connected between the midpoint of the high-voltage group half-bridge circuit and the midpoint of the low-voltage group half-bridge circuit, and gates of the half-bridge circuits are connected to a corresponding driving output via the chain-type driving capacitor network.

The working principle of the battery pack voltage cascade interface 73 is similar to that of the above-mentioned balanced half-bridge circuits, except that voltages of two ends of the switch capacitor Cb of the energy storage capacitor network are the a voltage of the battery pack, rather than a voltage of a battery unit, and under the action of a half-bridge switch, the switch capacitor Cb is repeatedly connected in parallel to two ends of the present battery pack and the previous cascaded battery pack to achieve voltage balance.

FIG. 7b is a schematic diagram showing wiring on the battery pack voltage cascade interface in the present embodiment, which is used for the balance of the internal cascaded battery units and the balance of Packs; and each of B/BD1 or B/BD2 is the cell balancing device, and each of Pack1 and Pack2 is the battery pack 1. B/BD1 is connected to the battery units in the battery pack in a one-to-one correspondence way, thereby achieving the balance of the internal battery units; and a balancing interface B2n is connected to the positive electrode of the previous cascaded Pack2, and the positive electrode of Pack1 is connected to the negative electrode of Pack2, so that balance among the cascaded battery packs is completed.

Figure 7C:
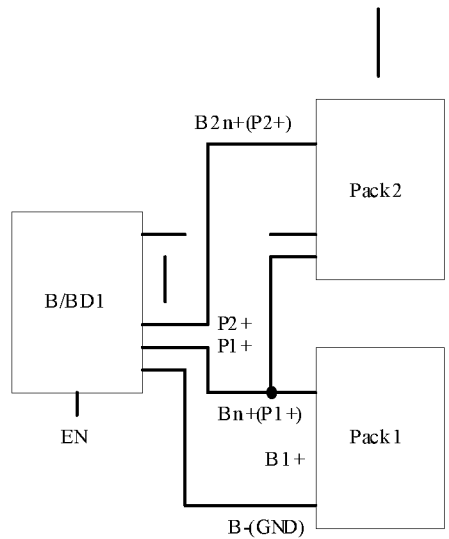

FIG. 7c is a schematic diagram showing wiring on a secondary battery pack voltage cascade interface in the embodiment which is used for the balance of the Packs; and B/BD1 is the cell balancing device, and each of Pack1 and Pack2 is a battery pack. Pack1 is connected to the battery unit B1 of B/BD1, Pack2 is connected to the battery unit B2 of B/BD1, Packn is connected to the battery unit Bn of B/BD1, Pack n+1 is connected to the battery unit Bn+1 of B/BD1, and thus, the balance of n+1 battery packs is achieved, and the interface is particularly applicable to an occasion where a lead-acid battery pack is used as a power battery.

The unit voltage cascade interface is applicable to the balance in a battery pack and the balance of the battery units of the battery packs; the high-voltage cascade interface, i.e. the battery pack voltage cascade interface is applicable to series-connected units on which the Pack has been assembled; a high-voltage battery pack is usually formed by connecting several battery packs in series; and the balance among the cascaded battery packs may also be achieved by adopting the cell balancing device shown in FIG. 7c in addition to the above-mentioned form of the high-voltage cascade interface, and the battery packs are regarded as the battery units, and thus, secondary balance among the cascaded packs is achieved.

The present device is good in expandability, additional balancing ports appearing when the battery packs are formed may be hung in the air, cascade may be performed when there are no sufficient ports, and the device is not only applicable to the internal balance of the battery units, but also is applicable to the external balance of the battery packs connected in series so as to be high in universality.

Embodiment 8

Figure 8:
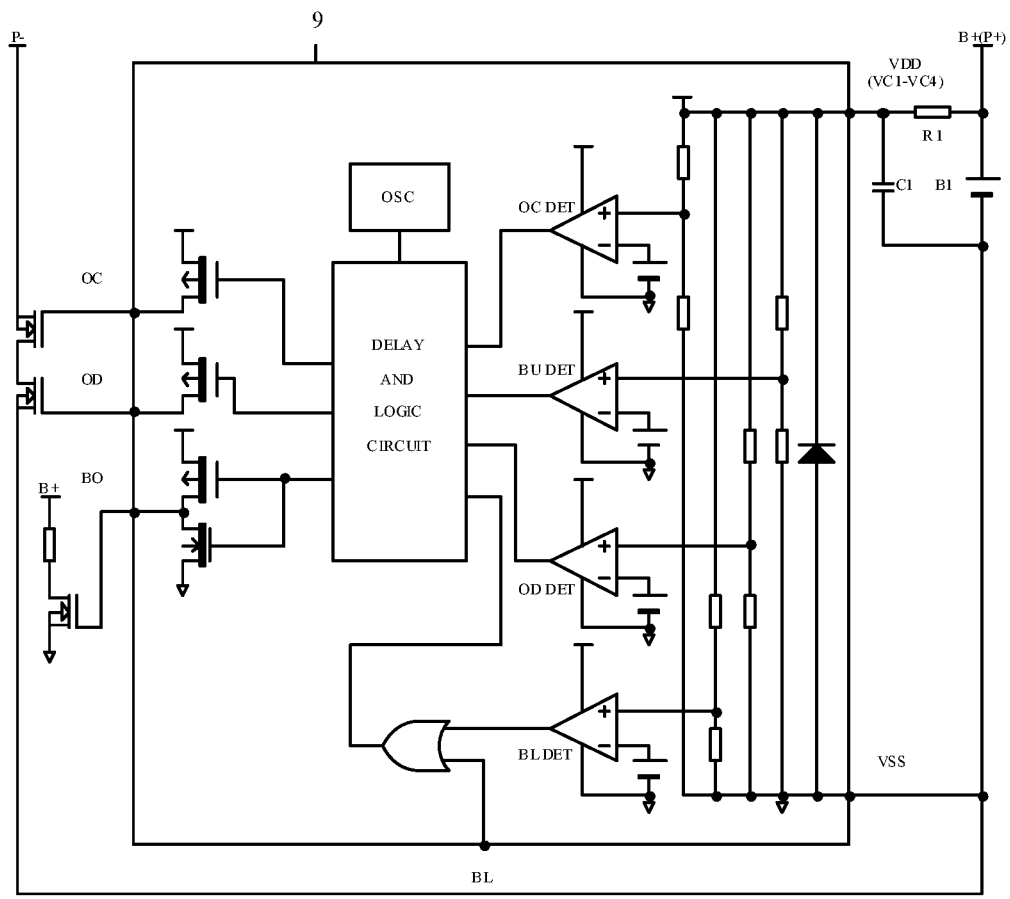
FIG. 8 is a schematic block diagram showing a control logic circuit in an embodiment of the present application.

In order to further simplify the design of an application circuit, parts of circuits in the present application may be integrated, as shown in FIG. 8. Further description is shown as follows:

FIG. 8 is a schematic block diagram showing a control logic circuit in the present embodiment, wherein a charge/discharge protection circuit 9 of the control logic circuit 6 comprises a charge balance voltage detector BU DET, a discharge balance voltage detector BL DET, a charge overvoltage protection detector OC DET, a discharge overvoltage protection detector OD DET as well as a delay and logic circuit for a input voltage and is provided with a discharge balance selection control input end BL, an overcharge protection output end OC, an overdischarge protection output end OD and a balance control output end BO. In a single-channel input solution, 6-pin SOT 23-6 package or 8-pin TSSOP-8 package may be adopted; in a multichannel (4-channel or 5-channel is recommended) input solution, small 16-pin package may be adopted; and the typical working current is lower than 10 µA. For the three-channel overcharge, overdischarge and balance outputs, a high-voltage (e.g. 20V or above) OD (Open Drain) form is adopted, and multichannel input application may be formed by chain-type cascade; and the balance output may drive a resistor energy-consumption-type balancing circuit or may directly drive a capacitor or inductor balancing circuit to be enabled or a power switch. The balance selection control input end may select whether discharge balance is started.

By integration, the product quality can be effectively improved, invalidation can be reduced, a product can also be accelerated to appear on the market, and a rapid response to a customer demand can be achieved.

The above descriptions are merely some embodiments of the present application, rather than limitations on the present application in other modes. Those skilled in the art can change or alter the embodiments by virtue of the above-mentioned technical contents to form equally-changed equivalent embodiments to be applied to other fields. However, any simple modifications, equivalent changes and alterations made, without departing from contents of the technical solutions of the present application, for the above-mentioned embodiments according to the technical essence of the present application still fall into the protection scope of the technical solutions of the present application.

The invention claimed is:

1. A cell balancing device based on a capacitor network, which is used for balance control on a battery pack, wherein, the battery pack comprises n battery units B1, B2, . . . , Bn connected in series, and the cell balancing device comprises:

n half-bridge circuits, two ends of each half-bridge circuit being connected in parallel to two ends of a battery unit in the battery pack, and each half-bridge circuit comprising two switch transistors connected in series;

an energy storage capacitor network comprising a basic energy storage capacitor network formed by connecting n−1 switch capacitors C1, C2, . . . , Cn−1 in series, and the switch capacitors C1, C2, . . . , Cn−1 being sequentially connected in parallel between every two midpoints of the n half-bridge circuits;

a chain-type driving capacitor network, with one end being electrically connected to the half-bridge circuits or the energy storage capacitor network, and an other end being electrically connected to a drive-pulse generator, and the chain-type driving capacitor network comprising n driving capacitors sequentially connected in series or in parallel to form a chain-type structure; and a control logic circuit electrically connected to the battery pack, the drive-pulse generator and a master control panel and configured to control enable, frequency and a power switch of the drive-pulse generator;

wherein n is a positive integer; each of the battery units comprises at least one of a cell unit having a unit voltage, a composite cell unit formed by connecting cell units in parallel and a high-voltage battery pack unit formed by connecting cell units in series;

a plurality of battery packs are sequentially connected in series via a cascade interface circuit to form a cascadable balanced battery pack, when the cell balancing device works, a battery pack transfers power to a previous cascaded battery pack via the cascade interface circuit, and meanwhile, the cell balancing device of the previous cascaded battery pack is started via a cascade enable control circuit to form a long-string battery pack provided with an active balancing device, so that balance control among all the cascaded battery packs is achieved;

the cascade interface circuit comprises a balance control enable EN end, a unit voltage cascade interface and/or a battery pack voltage cascade interface;

the balance control enable EN end comprises the cascade enable control circuit which comprises an input end EN/I and an output end EN/O, and the balance control enable EN end is configured to forcedly start the cell balancing device when the battery pack or the cell units enter a charge overvoltage state OC or a discharge overvoltage state OD, and meanwhile, a voltage of the battery pack or voltages of the cell units are not lower than a discharge balance stopping voltage $V_{BDL}$;

the unit voltage cascade interface is configured to achieve charge balance of the cell units in the cascadable balanced battery pack and charge/discharge balance in the high-voltage battery pack unit; and the battery pack voltage cascade interface is configured to achieve voltage balance among the cascaded battery packs in the long-string battery pack;

wherein the unit voltage cascade interface comprises:

a low-voltage cascade balancing circuit;

an interface half-bridge circuit electrically connected to the switch capacitor Cn−1 of the basic energy storage capacitor network via a switch capacitor Cn; and at least one low-voltage cascade driving capacitor network electrically connected to the interface half-bridge circuit, one of the half-bridge circuits and the chain-type driving capacitor network.

2. The cell balancing device based on the capacitor network according to claim 1, wherein the energy storage capacitor network further comprises a multilayer chain-type energy storage capacitor network, and the multilayer chain-type energy storage capacitor network comprises switch capacitors Cn+1, Cn+2, C2n−2, wherein the switch capacitors Cn+1, Cn+2, C2n−2 and the basic energy storage capacitor network form a pyramidic chain-type energy storage capacitor network.

3. The cell balancing device based on the capacitor network according to claim 2, wherein the drive-pulse generator adopts, but is not limited to a self-oscillator, a 555 timer, a PWM controller, a single chip microprocessor or a special half-bridge driver IC, so as to generate a drive-pulse signal, and the drive-pulse signal is a square-wave pulse having a duty ratio of 50% or a pair of complementary square-wave pulses having the same polarity or opposite polarities and a duty ratio approximate to 50% and having dead time.

4. The cell balancing device based on the capacitor network according to claim 3, wherein the control logic circuit controls a power supply or the enable of the drive-pulse generator to be cut off to make the drive-pulse generator enter a standby state within a range of a normal battery working voltage and a discharge overvoltage state.

5. The cell balancing device based on the capacitor network according to claim 4, wherein the control logic circuit is integrated with a charge/discharge protection circuit, and the charge/discharge protection circuit comprises:

at least one set of input voltage detectors, the input voltage detectors comprising a charge overvoltage detector, a discharge overvoltage detector, a charge balance detector and a discharge balance detector and being configured to acquire voltage information of the battery units and/or the battery pack and output the voltage information to the control logic circuit so as to output corresponding balance control signals;

each of the charge overvoltage detector, the discharge overvoltage detector, the charge balance detector and the discharge balance detector adopts a voltage comparator with micro-power consumption and high precision.

6. A cascadable balanced battery pack adopting the cell balancing device based on the capacitor network according to claim 1, wherein each of the battery units comprises at least one of a cell unit having a unit voltage, a composite cell unit formed by connecting cell units in parallel and a high-voltage battery pack unit formed by connecting cell units in series;

a plurality of battery packs are sequentially connected in series via a cascade interface circuit to form the cascadable balanced battery pack, when the cell balancing device works, a battery pack transfers power to a previous cascaded battery pack via the cascade interface circuit, and meanwhile, the cell balancing device of the previous cascaded battery pack is started via a cascade enable control circuit to form a long-string battery pack provided with an active balancing device, so that balance control among all the cascaded battery packs is achieved;

the cascade interface circuit comprises a balance control enable EN end, a unit voltage cascade interface and/or a battery pack voltage cascade interface;

the balance control enable EN end comprises the cascade enable control circuit which comprises an input end EN/I and an output end EN/O, and the balance control enable EN end is configured to forcedly start the cell balancing device when the battery pack or the cell units enter a charge overvoltage stage OC or a discharge overvoltage state OD, and meanwhile, a voltage of the battery pack or voltages of the cell units are not lower than a discharge balance stopping voltage $V_{BDL}$;

the unit voltage cascade interface is configured to achieve charge balance of the cell units in the cascadable balanced battery pack and charge/discharge balance in the high-voltage battery pack unit; and the battery pack voltage cascade interface is configured to achieve voltage balance among the cascaded battery packs in the long-string battery pack;

wherein the unit voltage cascade interface comprises:

a low-voltage cascade balancing circuit;

an interface half-bridge circuit electrically connected to the switch capacitor $C_{n-1}$ of the basic energy storage capacitor network via a switch capacitor $C_n$; and at least one low-voltage cascade driving capacitor network electrically connected to the interface half-bridge circuit, one of the half-bridge circuits and the chain-type driving capacitor network.

7. The cascadable balanced battery pack according to claim 6, wherein in the unit voltage cascade interface, the low-voltage cascade balancing circuit comprising an auxiliary energy storage capacitor CB;

the interface half-bridge circuit comprising two switch transistors;

each low-voltage cascade driving capacitor network at least comprising a driving resistor and a driving capacitor;

wherein an interface end B$n$+1 of the unit voltage cascade interface is electrically connected to a positive electrode B+ of the battery pack via the auxiliary energy storage capacitor CB, and meanwhile, two ends of the auxiliary energy storage capacitor CB are further connected in parallel to the interface half-bridge circuit; and the positive electrode B+ of the battery pack is connected to a negative electrode B− of the previous cascaded battery pack, and the interface end B$n$+1 is connected to a positive electrode of a first battery unit of the previous cascaded battery pack.

8. The cascadable balanced battery pack according to claim 7, wherein the battery pack voltage cascade interface comprises:

a high-voltage cascade balancing circuit comprising a high-voltage auxiliary energy storage capacitor CB;

a high-voltage group half-bridge circuit at least comprising two switch transistors;

a low-voltage group half-bridge circuit with two ends being connected in parallel to the battery pack, and the low-voltage group half-bridge circuit at least comprising two switch transistors connected in parallel to the positive electrode and a negative electrode of the battery pack; and a high-voltage cascade driving resistor-capacitor network electrically connected to the high-voltage group half-bridge circuit, the low-voltage group half-bridge circuit and the chain-type driving capacitor network, and each high-voltage cascade driving resistor-capacitor network at least comprising a driving resistor and/or a driving capacitor;

wherein an interface end B2$n$ of the battery pack voltage cascade interface is electrically connected to the positive electrode B+ of the battery pack via the high-voltage auxiliary energy storage capacitor CB and is electrically connected to the positive electrode B+ of the battery pack at the same time via the high-voltage group half-bridge circuit; and the interface end B2$n$ is further connected to a positive electrode of the previous cascaded battery pack.

9. A battery pack balance control method based on a capacitor network, which is based on the cascadable balanced battery pack according to claim 6, wherein the control method comprises:

when a voltage of the battery pack is higher than a preset charge balance starting voltage $V_{BCH}$ and/or lower than a discharge balance starting voltage $V_{BDH}$, supplying power for the drive-pulse generator or generating enable to make the drive-pulse generator output a drive-pulse signal by the control logic circuit so that the cell balancing device is started; and when the voltage of the battery pack is lower than a charge balance stopping voltage $V_{BCL}$, lower than a discharge balance stopping voltage $V_{BDL}$ or higher than the discharge balance starting voltage $V_{BDH}$, cutting off the drive-pulse signal and stopping the cell balancing device by the control logic circuit.

10. The battery pack balance control method based on the capacitor network according to claim 9, wherein when the battery pack or the cell units enter the charge overvoltage state OC or the discharge overvoltage state OD, and meanwhile, the voltage of the battery pack or voltages of the cell units are not lower than the discharge balance stopping voltage $V_{BDL}$, starting the cell balancing device, otherwise, stopping the cell balancing device.

* * * * *